United States Patent [19]

Konii

[11] Patent Number: 5,570,599
[45] Date of Patent: Nov. 5, 1996

[54] STEERING LOCK DEVICE

[75] Inventor: Katsuji Konii, Yokohama, Japan

[73] Assignee: Alpha Corporation, Japan

[21] Appl. No.: 325,335

[22] PCT Filed: Mar. 26, 1993

[86] PCT No.: PCT/JP93/00241

§ 371 Date: Oct. 24, 1994

§ 102(e) Date: Oct. 24, 1994

[87] PCT Pub. No.: WO94/19217

PCT Pub. Date: Sep. 1, 1994

[51] Int. Cl.$^6$ .................................................. B60R 25/02
[52] U.S. Cl. ................................................ 70/186; 70/252
[58] Field of Search .............................. 70/183–186, 252

[56] References Cited

U.S. PATENT DOCUMENTS

| 4,771,619 | 10/1988 | Shiramizu et al. | 70/252 X |
| 4,798,067 | 1/1989 | Peitsmeier et al. | 70/186 X |
| 4,972,692 | 11/1990 | Morikawa et al. | 70/252 X |
| 4,981,026 | 1/1991 | Sakuno et al. | 70/252 X |
| 4,987,756 | 1/1991 | Fancher | 70/186 |
| 5,036,686 | 8/1991 | Ichinose | 70/252 X |
| 5,092,147 | 3/1992 | Mochida et al. | 70/252 |
| 5,211,042 | 5/1993 | Watanuki | 70/252 |
| 5,315,851 | 5/1994 | Kuroki | 70/186 X |

FOREIGN PATENT DOCUMENTS 3638429  5/1988  Germany .......................... 70/252

Primary Examiner—Steven N. Meyers
Assistant Examiner—Monica E. Millner
Attorney, Agent, or Firm—Bachman & LaPointe, P.C.

[57] ABSTRACT

A steering lock device comprises a key cylinder 14 rotatably provided in a sleeve 13 which is arranged within the a frame 11; a first rotor 16 arranged, being capable of rotating, being capable of moving in the axial direction with respect to the sleeve 13, and connected with a cam for the key cylinder 14; a second rotor 18 connected with a locking rod 32 and an ignition switch 28 in operation; and a connector 17 arranged between the first rotor 16 and the second rotor 18. When the key cylinder 14 is rotated relative to the sleeve 13, the key cylinder 14 is connected with the second rotor 18, and thereby the locking rod 32 is moved to the unlocked position from the locked position. When a foreign key is inserted into the key cylinder 14, the key cylinder 14 is rotated together with the sleeve 13 as one unit, thereby the locking rod 32 cannot be moved to the unlocked position. The present invention enables the key cylinder 14 to make free rotation faultlessly in case of unauthorized attempts to unlock the steering lock device 10.

8 Claims, 42 Drawing Sheets

STEERING LOCK DEVICE

FIELD OF THE INVENTION

The present invention relates, in general, to lock devices, and more particularly, to a steering lock device that provides significant resistance to destruction, damage or tampering.

BACKGROUND OF THE INVENTION

In the conventional cylinder lock devices, the proper key can be rotated to the locked position or the unlocked position in a key cylinder having tumblers which are engaged with grooves formed within a case. In a conventional steering lock device that prevents the rotation of the key cylinder by means of the tumblers engaged with the grooves within the case, there is a danger that unauthorized unlock will occur as a result of damage to the tumblers. Thus, for example, as disclosed in Japanese Patent Disclosure No. 1-315569, a free-turn type cylinder lock has been proposed, wherein a key cylinder is designed, so that it can be freely rotated against an unauthorized attempt to unlock when rotational force is applied to the key cylinder. This cylinder lock is provided with a sleeve rotatably arranged in a case and the key cylinder rotatably supported within the sleeve.

When the proper key is inserted into the key cylinder, tumblers within the key cylinder are disengaged from grooves formed within the sleeve, and thereby the key cylinder can be rotated relative to the sleeve, so that a sliding ring engages with a lock-piece operating member to actuate the lock. If a foreign key is inserted into the key cylinder, as the key cylinder is kept in the condition that it is engaged with the sleeve by means of the tumblers, the key cylinder rotates together with the sleeve. Thus, the lock-piece operating member is prevented from rotating, and thereby the lock device cannot be actuated.

In case a foreign key is used in this kind of free-turn type cylinder lock, the key cylinder freely rotates. Therefore, since excessive rotation force that might break down the tumblers cannot be given to the lock, significant resistance can be given to the lock against damage or destruction.

However, the lock device disclosed in Japanese Patent Disclosure No. 1-315569 cannot be applied to a steering lock device. In order to apply the free-turn type cylinder lock to a steering lock device, it is further necessary to develop the technology concerned.

Accordingly, it is an object of the present invention to eliminate the aforementioned disadvantage and to provide a steering lock device with a key cylinder which is capable of freely rotating without fail in case of an unauthorized attempt to unlock.

DISCLOSURE OF THE INVENTION

The steering lock device according to the present invention includes a frame; a sleeve rotatably arranged in the frame; a key cylinder rotatably arranged in the sleeve; tumblers capable of engaging with hooking parts of the sleeve and slidably arranged in the key cylinder; a first rotor which is capable of rotating, capable of moving in the axial direction respect to the sleeve, and connected with the key cylinder by a cam; and a second rotor which is connected with a locking rod and an ignition switch in operation. When the key cylinder is rotated relative to the sleeve, the first rotor moves axially and is connected with the second rotor, and after that, the key cylinder, the first rotor and the second rotor are rotated together as one unit, then the locking rod is moved to the unlocked position from the locked position.

A sleeve holding device is arranged to prevent the rotation of the sleeve, and when the key cylinder is rotated under the condition of the engagement between the tumblers and the sleeve, the sleeve is rotated against the elasticity of the sleeve holding device. Also, the sleeve is rotatably arranged in a housing provided within the frame. A rotor spring is arranged between the first rotor and the second rotor. A connector is arranged between the first rotor and the second rotor. The connector prevents the second rotor from rotating when the first rotor is rotated together with the sleeve, and after the first rotor is axially moved, the second rotor is rotated together with the first rotor. After the key cylinder is rotated to a specific angle relative to the sleeve, if the key cylinder is further rotated, the first rotor will be further moved in the axial direction.

A check lever is movably mounted on a pin within the frame outside the sleeve so that the lever can swing around the circumference of the pin. One of the ends of the check lever contacts a dog that slides in the diametrical direction when the key is inserted into the key cylinder, and the other end of the check lever connects with a check lever holding device in operation. The check lever holding device is provided with a delay device that holds the locking rod at the locked position until the key is removed from the key cylinder. The delay device includes a cylindrical member connected with the key cylinder in operation; a first hooking member which is slidably arranged within the opening of the cylindrical member and connected with the inner end of the check lever in operation; a return spring that pushes the first hooking member in the diametrical direction; a second hooking member which is provided with a protrusion capable of connecting with the frame and is slidable in parallel with respect to the first hooking member; and a supplementary spring that pushes the second hooking member in the diametrical direction opposite to the direction of the first hooking member. When the first hooking member is pushed by the inner end of the check lever, the protrusion of the second hooking member is held for the frame.

The frame includes a middle frame and a rear frame, and an particular motion can be made between the middle frame and the rear frame.

Before the proper key is inserted into the key cylinder, the key cylinder is connected with the sleeve by means of tile tumblers. Also, the sleeve is held in a specific portion by the sleeve holding device. The first rotor situated at tile separated position is in the disengaged condition for the second rotor.

When the proper key is inserted into the key cylinder, the tumblers are moved to positions away from the sleeve, and the engagement between the key cylinder and the sleeve is released. If the key is rotated in this condition, due to the relative rotation of the key cylinder against the sleeve, the first rotor will be axially moved to the engaged position from the separated position, and in the engaged position, the first rotor comes into engagement with the second rotor. After that, when the key cylinder is further rotated, the key cylinder is rotated together with the first rotor and the second rotor, and thereby the locking rod is move to the unlocked position from the locked position.

When a foreign key is inserted into the key cylinder, the key cylinder is kept in the condition that it is engaged with the sleeve by means of the tumblers. Under this condition, when the key is rotated, the key cylinder and the sleeve are rotated together as one unit. Therefore, as the relative rotations of the key cylinder and the sleeve do not occur, the first rotor is axially moved, and thereby it is not engaged with the second rotor. For this reason, the locking rod of the steering lock device cannot be moved to the unlocked position.

When the key cylinder is moved to the locked position from the ON position, the protrusion of the second hooking member of the delay device is held by the frame. Therefore, the key cylinder is moved back to the locked position, but the locking rod is not moved to the locked position. When the key is removed from the key cylinder, the check lever is rotated, and thereby the engagement between the inner end of the check lever and the first hooking member is released. For this reason, the engagement between the second hooking member and the frame is released. Because of this, the locking rod is moved to the locked position by the elasticity of a rod spring, and at the same time, the delay device is moved back to the initial position.

An particular motion can be made between the middle frame and the rear frame, and thereby the angle between the middle frame and the rear frame can be changed in the event that a change in design is provided for the inclination angle of the steering shaft.

BRIEF DESCRIPTION OF THE DRAWINGS

FIG. 120 is a cross-sectional view taken along line U—U in FIG. 1 showing the relationships among the components when the key cylinder is rotated to an angle of 120°.

FIG. 121 is a cross-sectional view taken along line T—T in FIG. 1 showing the relationships among the components when the key cylinder is rotated to an angle of 152°.

FIG. 122 is a cross-sectional view taken along line S—S in FIG. 1 showing the relationships among the components when the key cylinder is rotated to an angle of 152°.

FIG. 123 is a cross-sectional view taken along line U—U in FIG. 1 showing the relationships among the components when the key cylinder is rotated to an angle of 152°.

FIG. 124 is a cross-sectional view taken along line T—T in FIG. 1 showing the relationships among the components when the key cylinder is returned back to an angle of 120°.

FIG. 125 is a cross-sectional view taken along line S—S in FIG. 1 showing the relationships among the components when the key cylinder is returned back to an angle of 120°.

FIG. 126 is a cross-sectional view taken along line U—U in FIG. 1 showing the relationships among the components when the key cylinder is returned back to an angle of 120°.

FIG. 127 is a cross-sectional view taken along line T—T in FIG. 1 showing the relationships among the components when the key cylinder is returned back to an angle of 105°.

FIG. 128 is a cross-sectional view taken along line S—S in FIG. 1 showing the relationships among the components when the key cylinder is returned back to an angle of 105°.

FIG. 129 is a cross-sectional view taken along line U—U in FIG. 1 showing the relationships among the components when the key cylinder is returned back to an angle of 105°.

FIG. 130 is a cross-sectional view taken along line T—T in FIG. 1 showing the relationships among the components when the key cylinder is returned back to an angle of 90°.

FIG. 131 is a cross-sectional view taken along line S—S in FIG. 1 showing the relationships among the components when the key cylinder is returned back to an angle of 90°.

Figure 1:
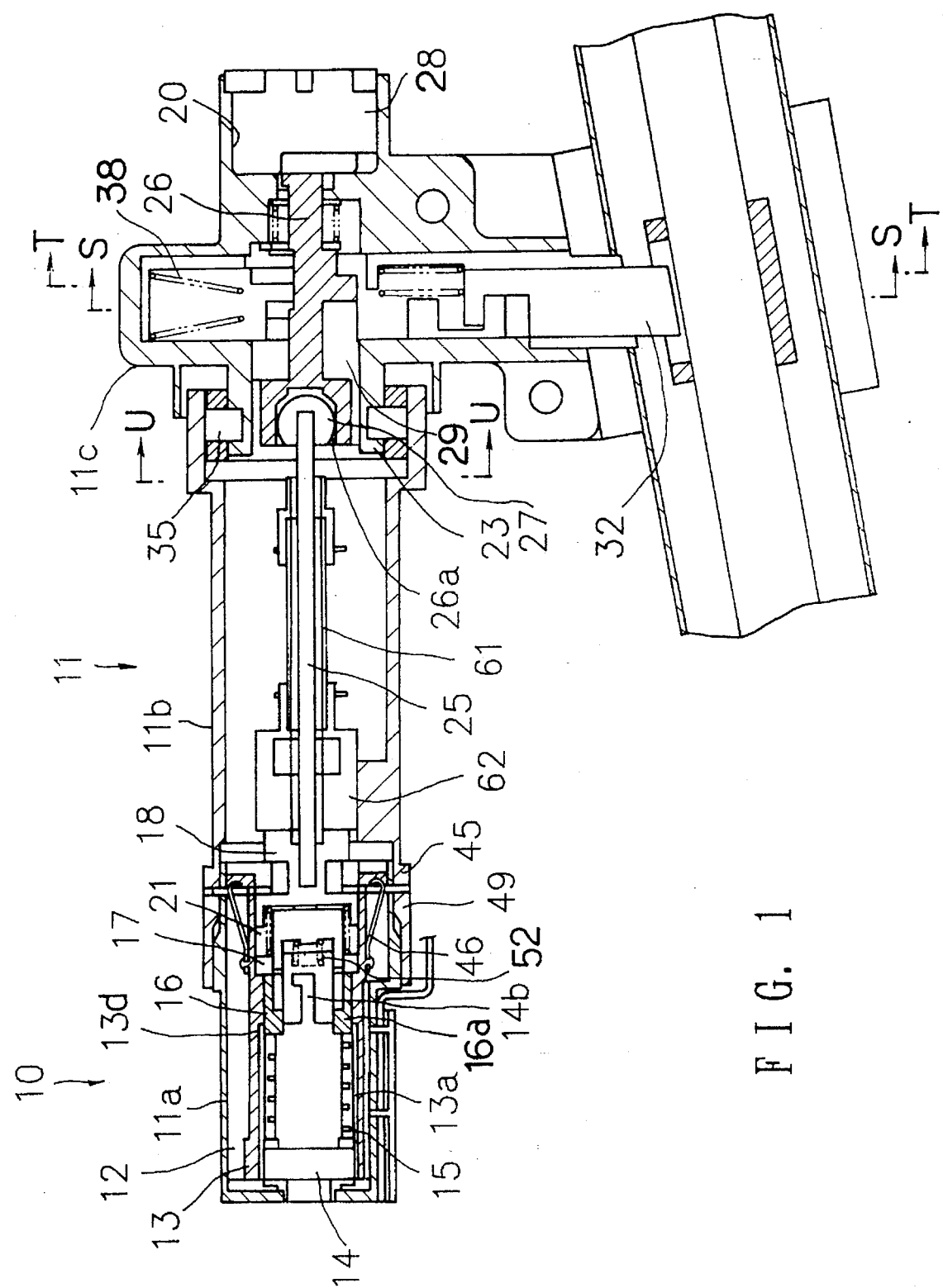
FIG. 1 is a cross-sectional view of a steering lock device according to the present invention.
Figure 132:
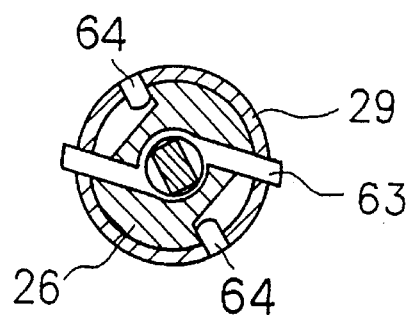

FIG. 132 is a cross-sectional view taken along line U—U in FIG. 1 showing the relationships among the components when the key cylinder is returned back to an angle of 90°.

Figure 133:
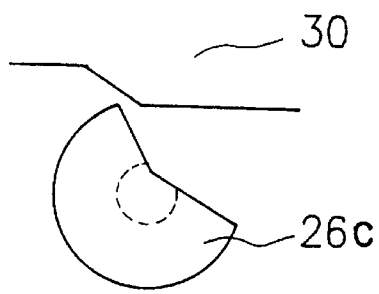

FIG. 133 is a cross-sectional view taken along line T—T in FIG. 1 showing the relationships among the components when the key cylinder is returned back to an angle of 60°.

Figure 134:
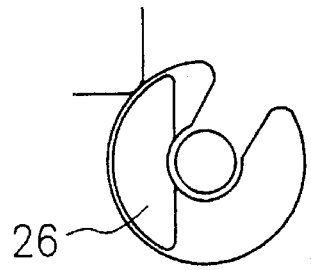

FIG. 134 is a cross-sectional view taken along line S—S in FIG. 1 showing the relationships among the components when the key cylinder is returned back to an angle of 60°.

Figure 135:
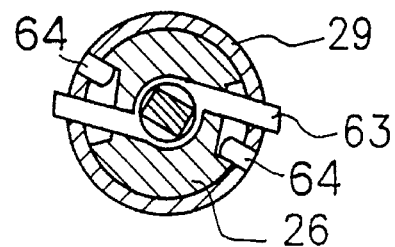

FIG. 135 is a cross-sectional view taken along line U—U in FIG. 1 showing the relationships among the components when the key cylinder is returned back to an angle of 60°.

Figure 136:
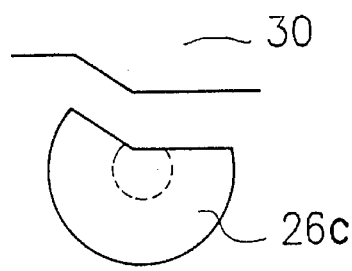

FIG. 136 is a cross-sectional view taken along line T—T in FIG. 1 showing the relationships among the components when the key cylinder is returned back to the locked position.

Figure 137:
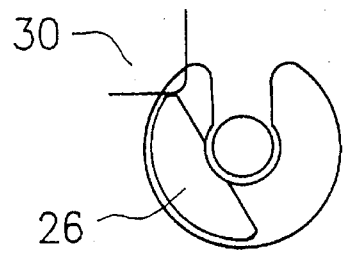

FIG. 137 is a cross-sectional view taken along line S—S in FIG. 1 showing the relationships among the components when the key cylinder is returned back to the locked position.

Figure 138:
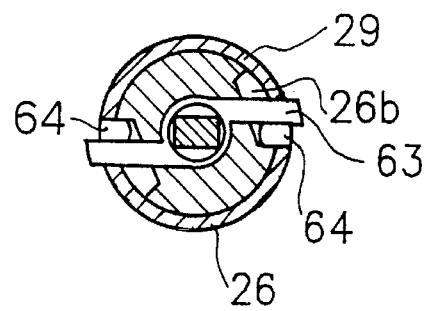

FIG. 138 is a cross-sectional view taken along line U—U in FIG. 1 showing the relationships among the components when the key cylinder is returned back to the locked position.

Figure 139:
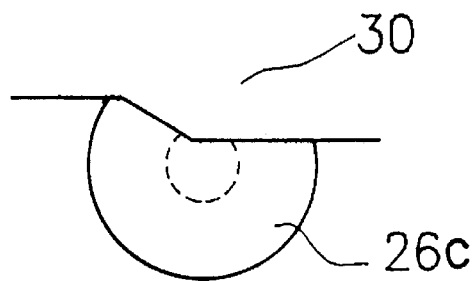

FIG. 139 is a cross-sectional view taken along line T—T in FIG. 1 showing the relationships among the components when the key is removed from the key cylinder.

Figure 140:
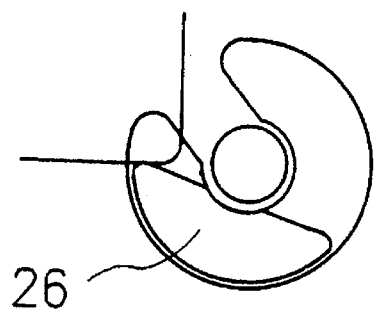

FIG. 140 is a cross-sectional view taken along line S—S in FIG. 1 showing the relationships among the components when the key is removed from the key cylinder.

Figure 141:
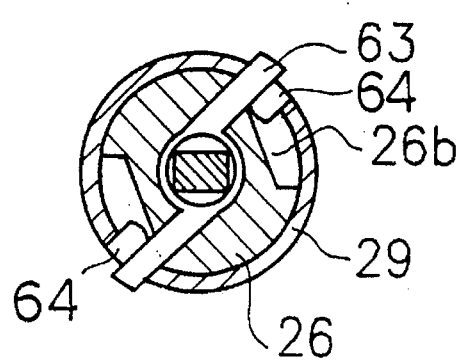

FIG. 141 is a cross-sectional view taken along line U—U in FIG. 1 showing the relationships among the components when the key is removed from the key cylinder.

PREFERRED EMBODIMENTS OF THE INVENTION

Referring to FIGS. 1 through 141, an embodiment of a steering lock device according to the present invention will be described as follows.

Figure 2:
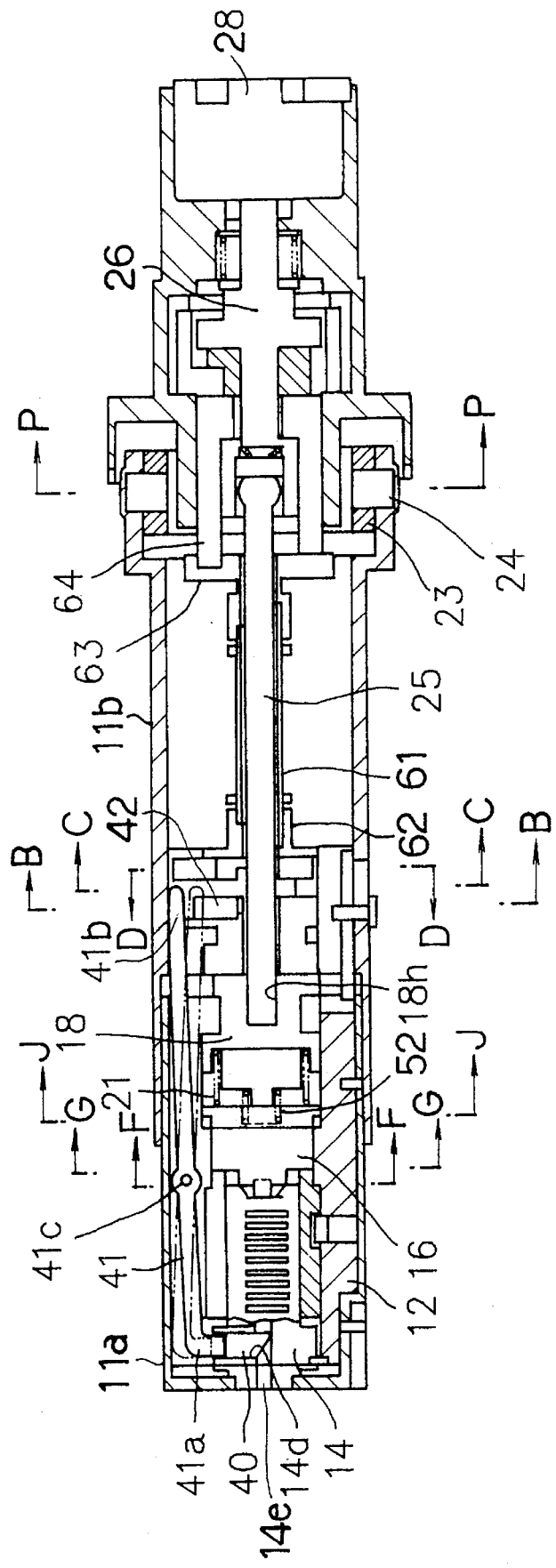
FIG. 2 is a cross-sectional view taken at the position rotated by an angle of 90° from FIG. 1.
Figure 3:
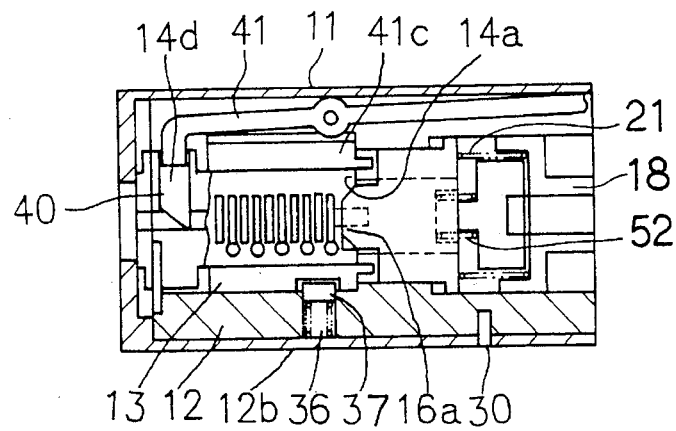
FIG. 3 is a cross-sectional view of the front frame.
Figure 4:
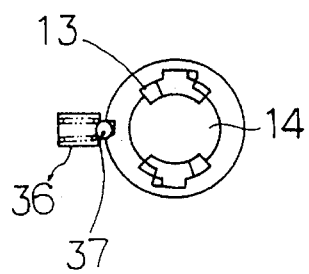
FIG. 4 is a cross-sectional view taken along line F—F in FIG. 2.
Figure 5:
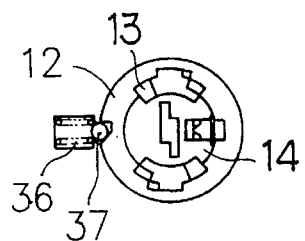
FIG. 5 is a cross-sectional view showing the relation between the key cylinder and the sleeve.
Figure 6:
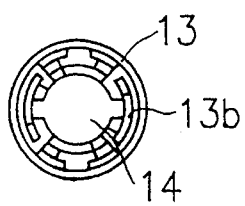
FIG. 6 is a cross-sectional view taken along line G—G in FIG. 2.
Figure 7:
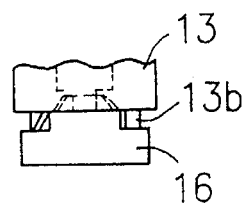
FIG. 7 is a cross-sectional view showing the relation between the sleeve and the first rotor.

As shown in FIGS. 1 and 2, the steering lock device 10 according to the present invention comprises a frame 11 that consists of a front frame 11a, a middle frame 11b which one of its ends is connected with the front frame 11a, and a rear frame 11c which is connected with the other end of the middle frame 11b. Within the front frame 11a, a housing 12, a sleeve 13 rotatably arranged in the housing 12, and a key cylinder 14 rotatably arranged in the sleeve 13 are provided.

Figure 27:
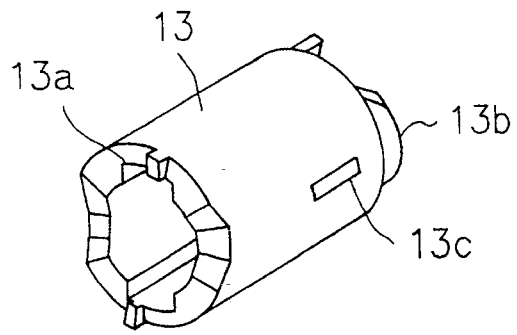
FIG. 27 is a perspective side view of the sleeve seen from the front.
Figure 28:
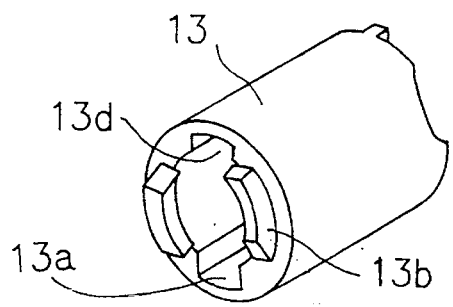
FIG. 28 is a perspective side view of the sleeve

As shown in FIGS. 27 and 28, the sleeve 13 is provided with grooves 13a formed inside in the longitudinal direction, cam protrusions 13b formed at the rear end, a V-shaped groove 13c formed around the external circumference, and concave parts 13b formed continuously at the rear ends of the grooves 13a.

As shown in FIG. 1, a key cylinder 14 is provided with a plurality of tumblers 15 that can protrude into or retract from the grooves 13a for engagement or disengagement, and thereby the key cylinder 14 is retained in the condition that it is engaged with the sleeve 13 by means of the tumblers 15. A first rotor 16, a connector 17, and a second rotor 18 are coaxially arranged with reference to the key cylinder 14 as shown in FIGS. 1 and 8.

Figure 8:
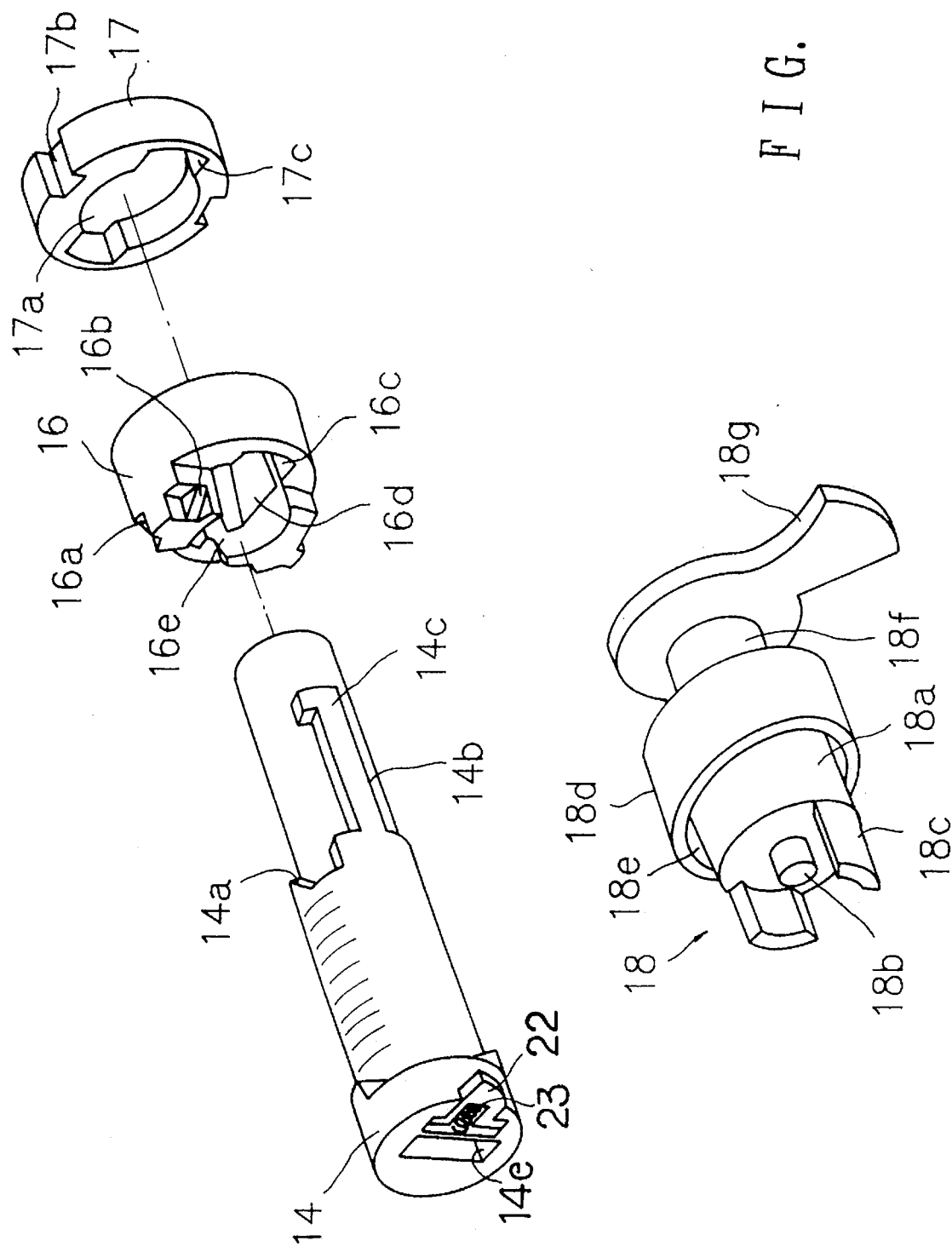
FIG. 8 is an exploded perspective view showing the relations among the key cylinder, the first rotor, the connector and the second rotor.
Figure 9:
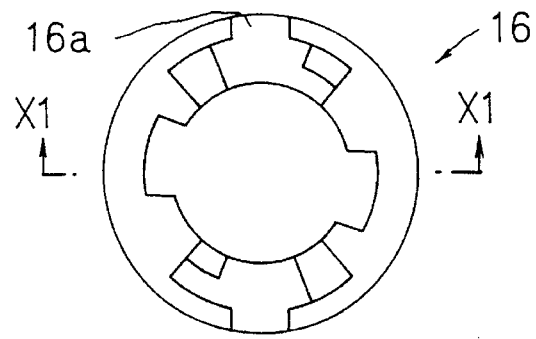
FIG. 9 is a plan view of the first rotor.
Figure 10:
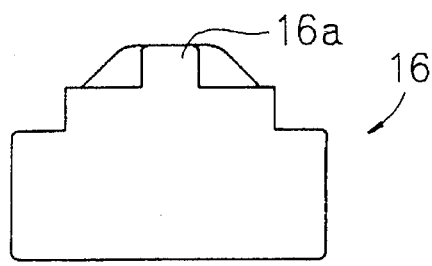
FIG. 10 is a side view of the first rotor.
Figure 11:
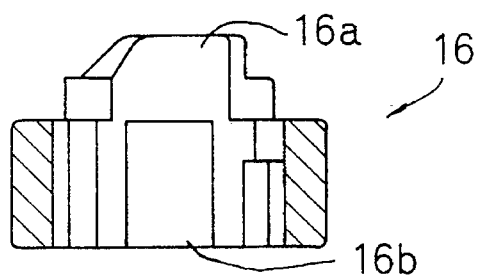
FIG. 11 is a cross-sectional view taken along line 11—11 in FIG. 9.
Figure 12:
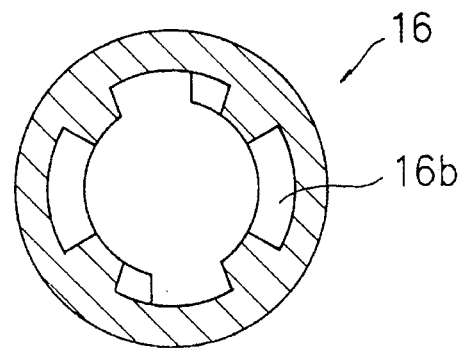
FIG. 12 is a bottom end view of the first rotor.
Figure 13:
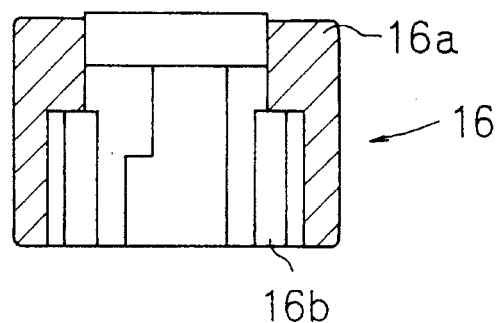
FIG. 13 is a cross-sectional view taken along line 13—13 in FIG. 9.
Figure 14:
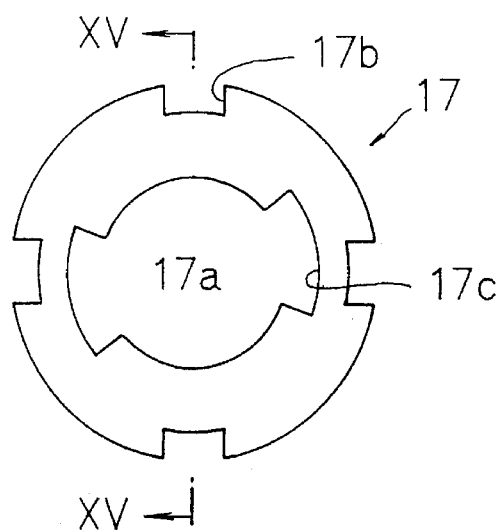
FIG. 14 is a plan view of the connector.
Figure 15:
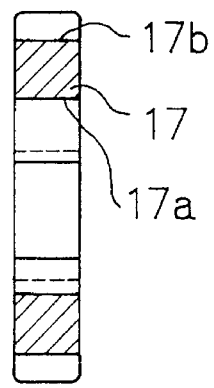
FIG. 15 is a cross-sectional view of the connector.
Figure 20:
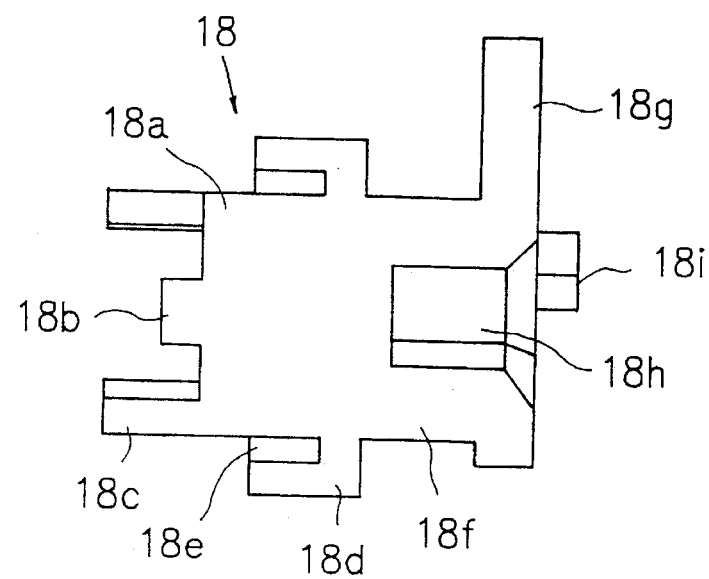
FIG. 20 is a plan view of the second rotor.
Figure 21:
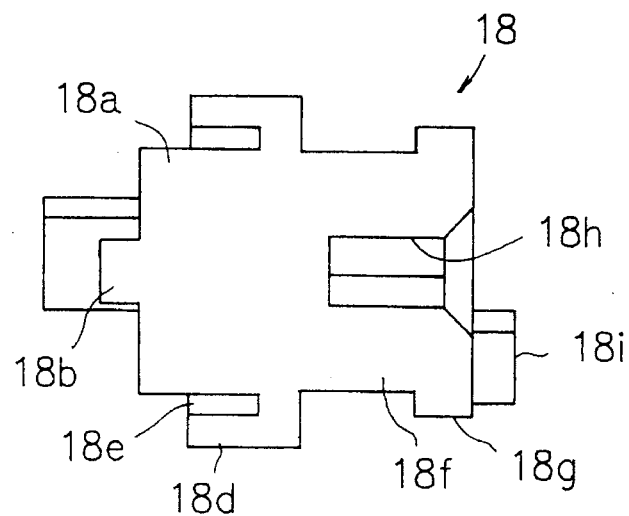
FIG. 21 is a side view of the second rotor.
Figure 22:
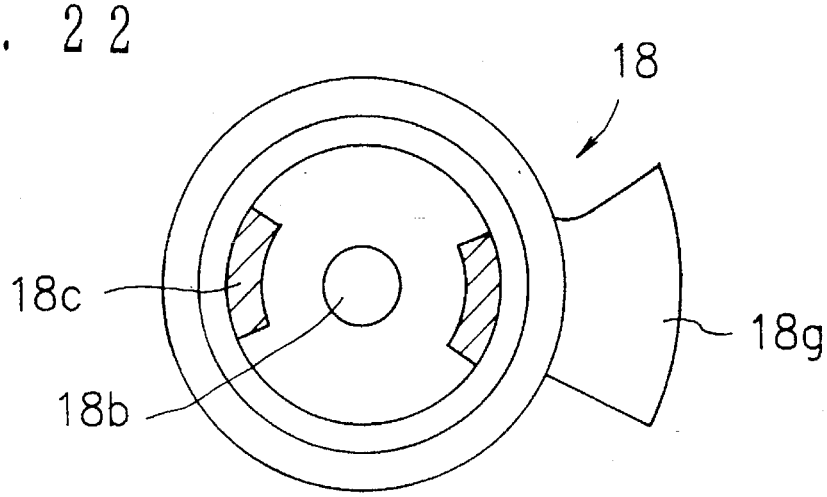
FIG. 22 is a plan view of the second rotor.
Figure 23:
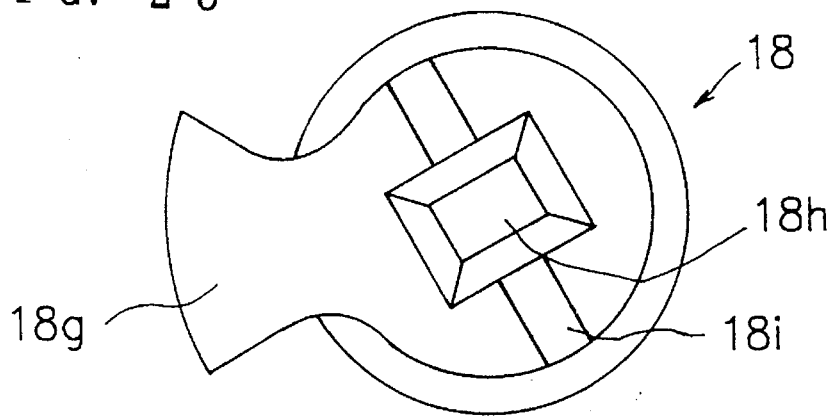
FIG. 23 is a rear end view of the second rotor.
Figure 24:
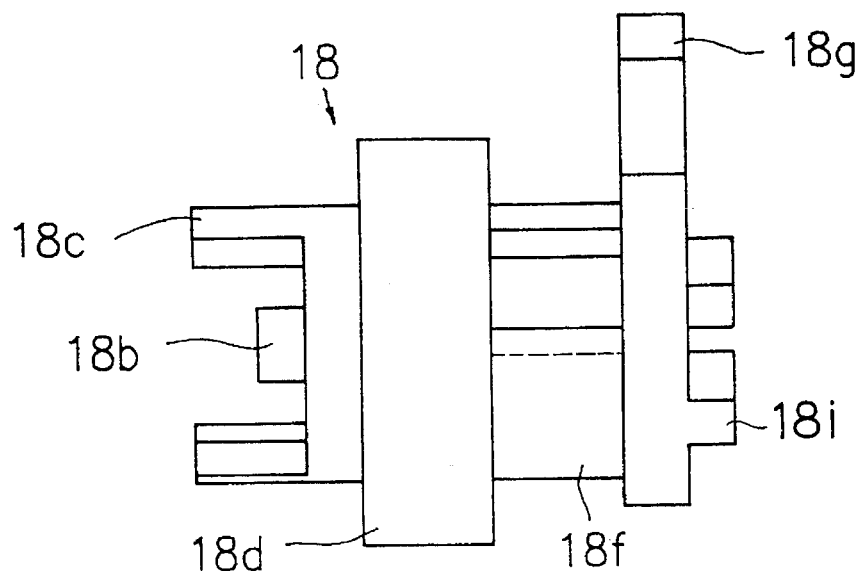
FIG. 24 is a bottom end view of the second rotor.
Figure 25:
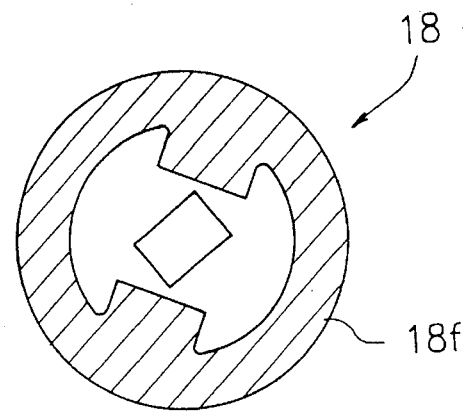
FIG. 25 is a cross-sectional view taken along line A—A in FIG. 21.

As clearly understood from FIG. 8, the key cylinder 14 consists of cylinder cams 14a and engage with the concave parts 16c of the first rotor 16. wide parts 14c are provided at the ends of the projections 14b. The first rotor 16 is provided with protrusions 16a which are capable of making contact with the cylinder cams 14a and engage with the concave parts 13b of the sleeve 13 as illustrated in FIGS. 27 and 28. Inclined surfaces 16b are formed on the protrusions 16a that contact the cylinder cams 14a. The first rotor 16 consists of a pierced hole 16e, the concave parts 16c formed between the protrusions 16a, which are paired, and a cutaway part 16d provided inside a pair of the protrusions 16a as shown in FIG. 8. A connector 17 is arranged adjacent to the first rotor 16. The connector 17 consists of a pierced hole 17a, grooves 17b formed in the axial direction, and concave parts 17c which are on the same axis as the concave parts 16c of the first rotor 16 exist. Also, the second rotor 18 has a cylindrical member 18a, a circular protrusion 18b that axially protrudes from the center of the cylindrical member 18a, a pair of external protrusions 18c which are arranged outside the circular protrusion 18b, a flange 18d arranged at the end of the cylindrical member 18a, an annular concave part 18e formed between the flange 18d and the cylindrical member 18a, a connecting member 18f provided at the end of the flange 18d, a lever 18g provided at the end of the connecting member 18f, a central concave part 18h (FIGS. 20 and 21) that goes through the inner sides of the connecting member 18f and the lever 18g, and a pair of key members 18i that protrude in the axial direction from the lever 18g. One of the ends of a rotor spring 21 (FIG. 1) is arranged at the annular concave part 18e, and the other end of the rotor spring 21 makes contact with the connector 17.

Figure 18:
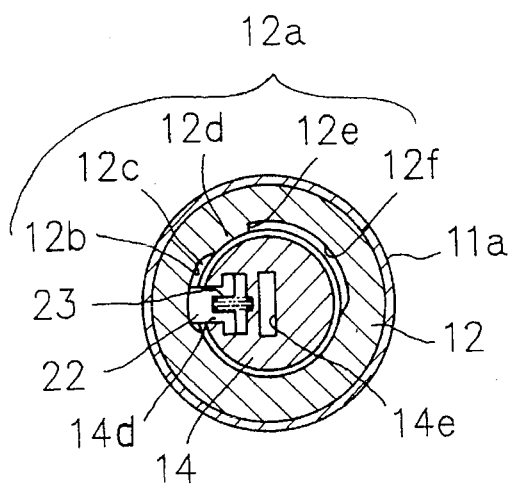
FIG. 18 is a cross-sectional view showing the front portion of the key cylinder.
Figure 70:
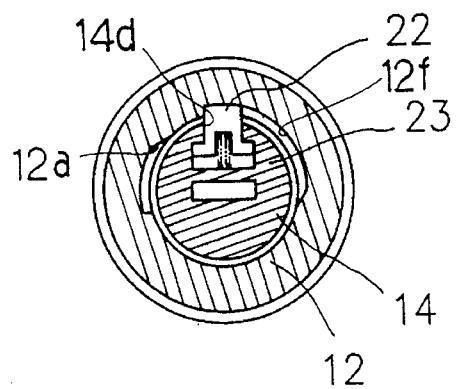
FIG. 70 is a side view that illustrates the front portion of the cylinder showing the relationships among the components when the key cylinder is rotated to an angle of 90°.
Figure 71:
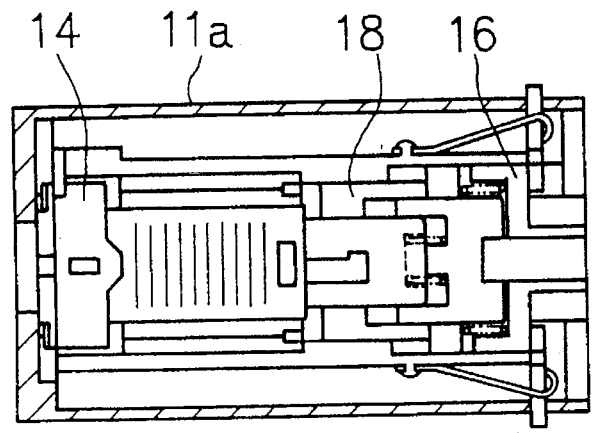
FIG. 71 is a different cross-sectional view of the front frame showing the relationships among the components when the key cylinder is rotated to an angle of 90°.
Figure 72:
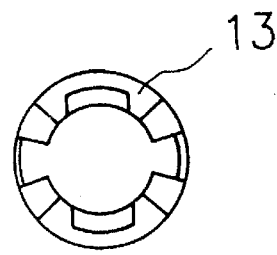
FIG. 72 is an end view of the sleeve.

As shown in FIGS. 8, 18 and 70, in a groove 14d located at the front portion of the key cylinder 14, a moving member 22 and a pushing spring 23 are arranged. The moving member 22 is outwardly pushed in the diametrical direction by means of the pushing spring 23, and is arranged inside a cam groove 12a of the housing 12. The cam groove 12a includes a first concave part 12b, an inclined surface 12c which is continuously provided in the circumferential direction from the first concave part 12b, a protrusion 12d that follows the inclined surface 12c, a contact surface 12e formed at the end of the protrusion 12d, and a second concave part 12f which is continuously arranged from the contact surface 12e. As clearly understood from FIGS. 18 and 70, in case a foreign key is used, the key cylinder 14 and the sleeve 13 rotate clockwise, but they do not rotate anticlockwise.

Figure 78:
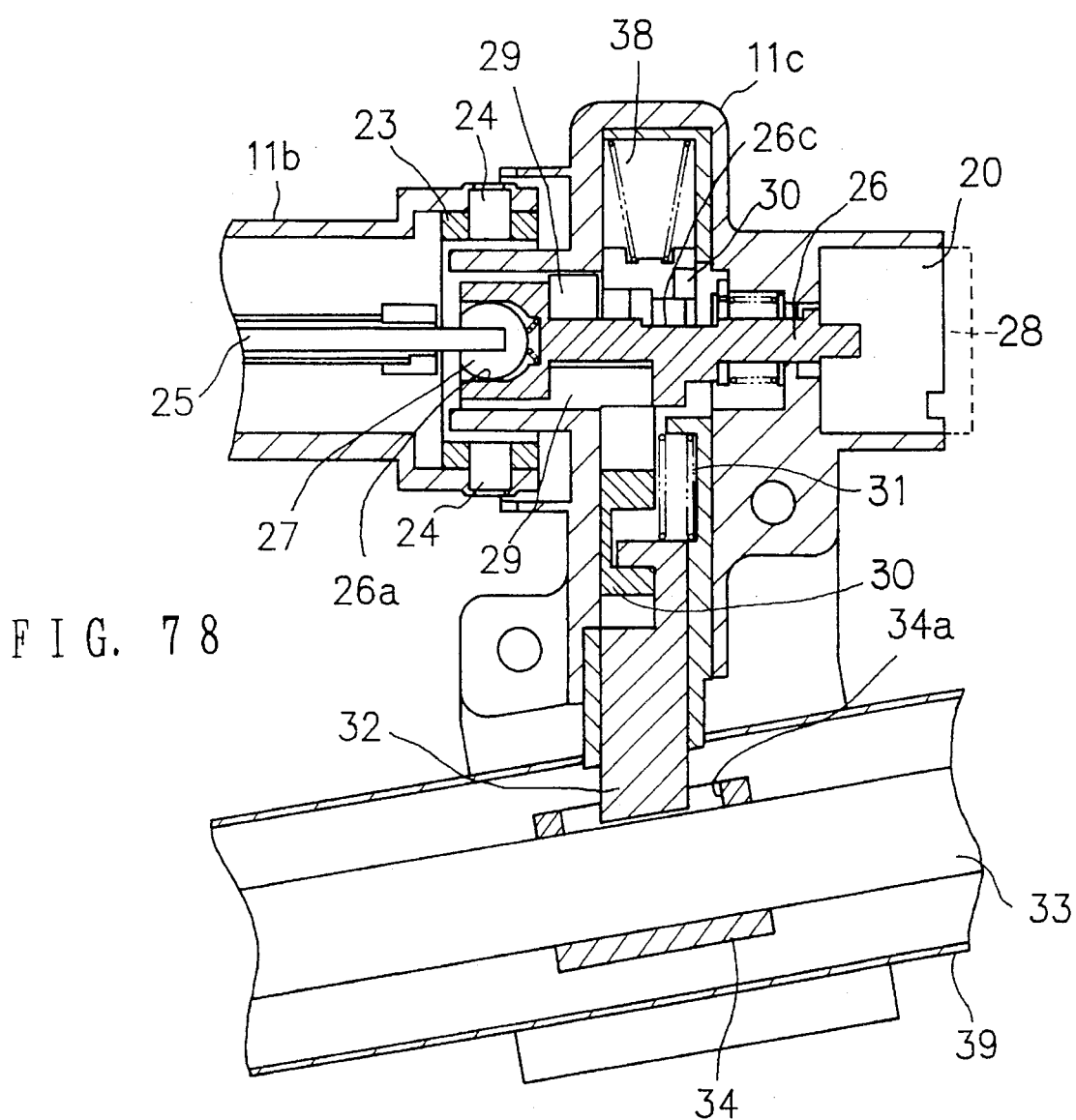
FIG. 78 is a cross-sectional view of the steering lock device showing the inside of the rear frame.
Figure 79:
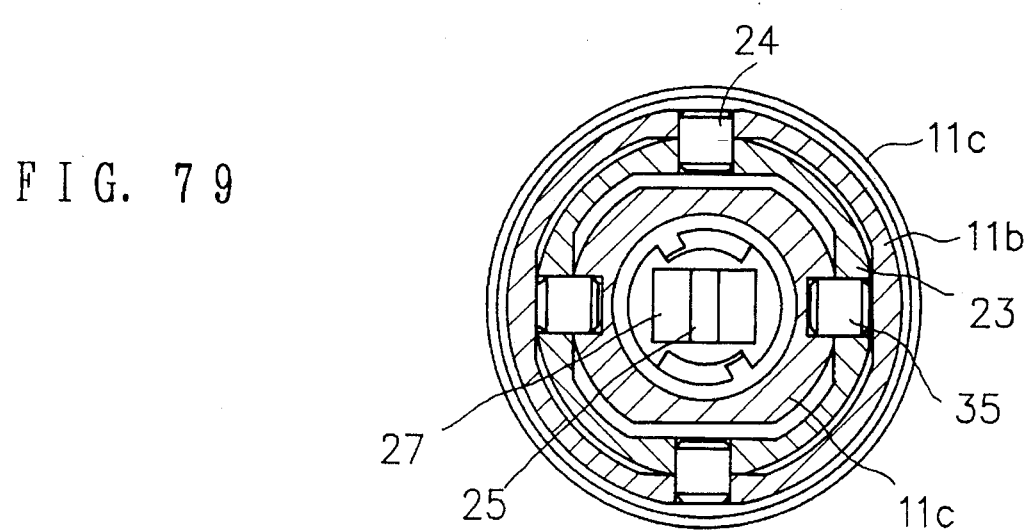
FIG. 79 is a cross-sectional view taken along line P—P in FIG. 2.
Figure 80:
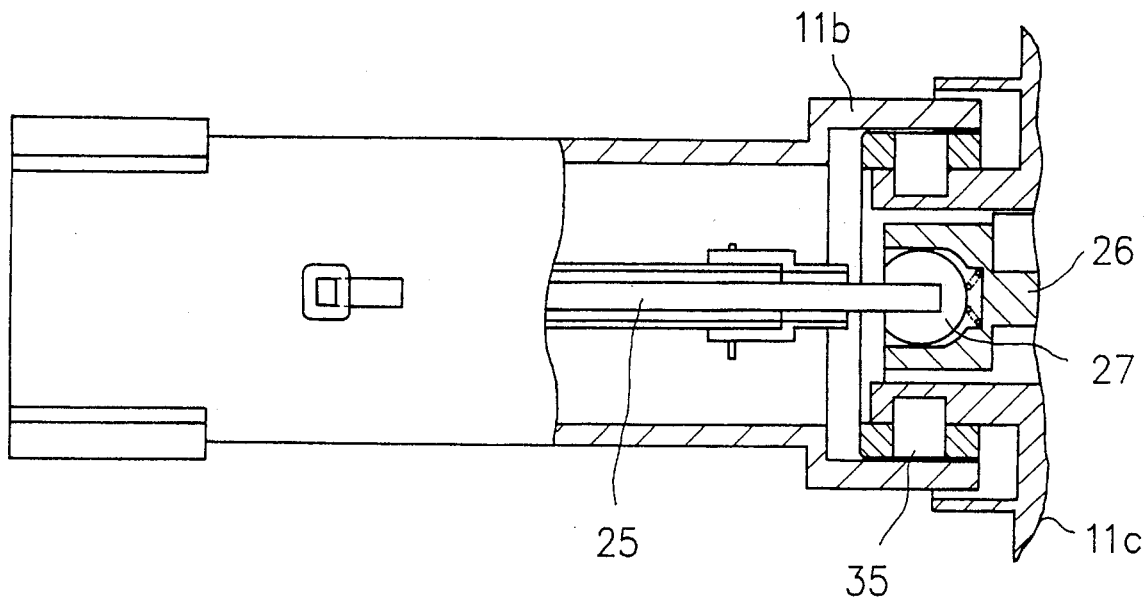
FIG. 80 is a partial cross-sectional view showing the tilt structure.
Figure 108:
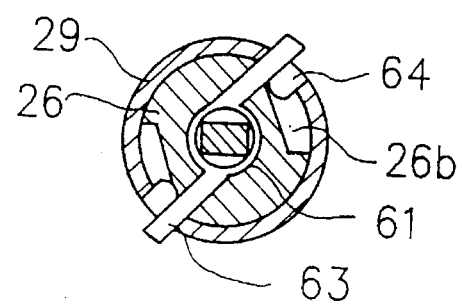
FIG. 108 is a cross-sectional view taken along line U—U in FIG. 1.

As indicated in FIGS. 1 and 2, between the middle frame 11b and the rear frame 11c, there are axle 24 and axle 35; the axle 24 (FIG. 2), which is arranged between the middle frame 11b and a sleeve 23, and the axle 35 (FIG. 1), which is arranged between the sleeve 23 and the rear frame 11c, provide a structure which is capable of bending corresponding to a tilt structure. The axle 24 and the axle 35 make up a joint that enables the middle frame 11b to bend relative to the rear frame 11c. The second rotor 18 is connected with a disc 27, which is arranged inside a concave part 26a formed at one of the ends of a connector shaft 26, by means of a connector 25. The other end of the connector shaft 26 is connected with an ignition switch 28 arranged inside an opening 20. As indicated in FIG. 78, the connector shaft 26 is rotatably arranged within a receptacle member 29 in the rear frame 11c. As described in the drawing, the connector shaft 26 is provided with the concave part 26a. As shown in FIG. 108, a pair of arms 63 that extend in the diametrical direction are provided at the end of a connecting rod 61. Each arm 63 is arranged so that they can be respectively engaged with axially extending projections 64, which are paired, provided on the receptacle member 29. Also, the projections 64 are respectively arranged in annular grooves 26b of the connector shaft 26. Therefore, it is possible that the connector shaft 26 and the receptacle member 29 are rotated relative to each other within the range where the projections 64 move in the annular grooves 26b.

Figure 106:
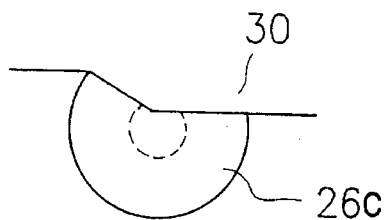
FIG. 106 is a cross-sectional view taken along line T—T in FIG. 1.
Figure 107:
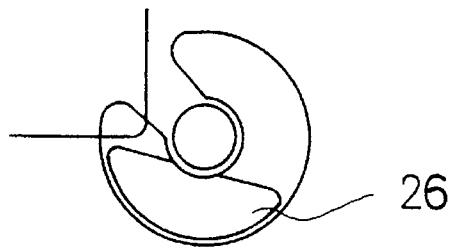
FIG. 107 is a cross-sectional view taken along line S—S in FIG. 1.

As shown in FIG. 78, the connector shaft 26 is provided with a cam 26c that makes contact with a hanger 30. The components concerned are situated as illustrated in FIGS. 106 to 108 until the key cylinder 14 is rotated to an angle of 30° from the locked position. A locking rod 32 is engaged with the hanger 30 via a rod spring 31. Also, the hanger 30 is resiliently urged downward by a rod spring 38, and therefore the locking rod 32 is pushed toward the locked position. The locking rod 32 is in the locked position in which it is engaged with a hole 34a of a collar 34 fixed to a steering shaft 33. The steering shaft 33 is rotatably arranged within in a column 39. Therefore, with the rotation of the key cylinder 14 arranged inside the front frame 11a, the locking rod 32 can be moved either to the locked position in which the locking rod 32 is engaged with the steering shaft 33 or the unlocked position in which the engagement between them is released. Also, the key cylinder 14 is connected with the ignition switch 28 via the connector shaft 26.

Figure 16:
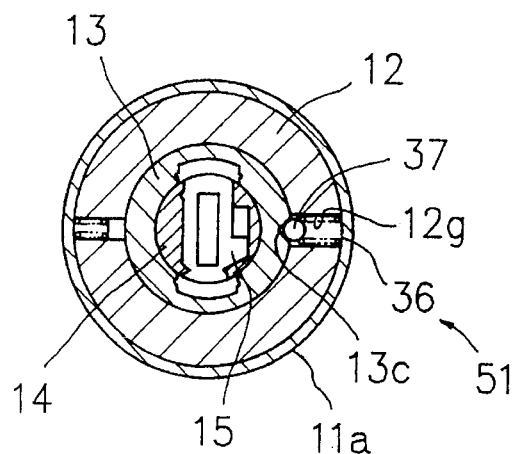
FIG. 16 is a cross-sectional view of the front frame.
Figure 17:
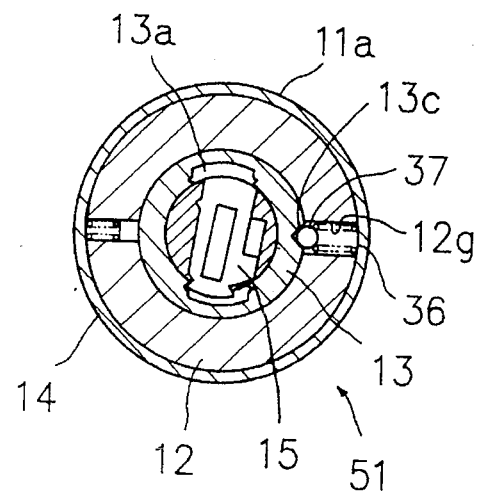
FIG. 17 is a cross-sectional view showing the relationships among the components when the tumblers are engaged with the sleeve.

As indicated in FIGS. 16 and 17, the housing 12 comprises a sleeve holding device 51 provided with a hole 12g formed in the diametrical direction. A ball spring 36 and a ball 37 are arranged inside the hole 12g. One of the ends of the ball spring 36 contacts the font frame 11a, and the other end of the ball spring 36 pushes the ball 37 into the V-shaped groove 13c of the sleeve 13. Therefore, the sleeve 13 is held by the pushing force in the position indicated in FIG. 16. However, as shown in FIG. 17, when the key cylinder 14 is rotated in the engaged condition that the tumblers 15 protrude into the grooves 13a of the sleeve 13, the key cylinder 14 rotates together with the sleeve 13 as one unit against the elasticity of the ball spring 36.

In the structure described above, the connector shaft 26 normally rests in the ordinary condition as shown in FIG. 1. Under this condition, when the key cylinder 14 is rotated by the key, the second rotor 18 and the connector shaft 26 are rotated, and thereby the locking rod 32 can be rotated to the unlocked position or the locked position.

As shown in FIG. 2, a dog 40 is slidably arranged in a hole 14d formed in the diametrical direction of the key cylinder 14. The inner end of the dog 40 protrudes into a key groove 14e of the key cylinder 14, and the outer end of the dog 40 makes contact with a bent end 41a of a check lever 41. The check lever 41 is arranged in the front frame 11a by means of a pin 41c so that it is able to swing. An inner end 41b of the check lever 41 is capable of making contact with a check lever holding device 42 as shown in FIGS. 2 and 29.

Figure 29:
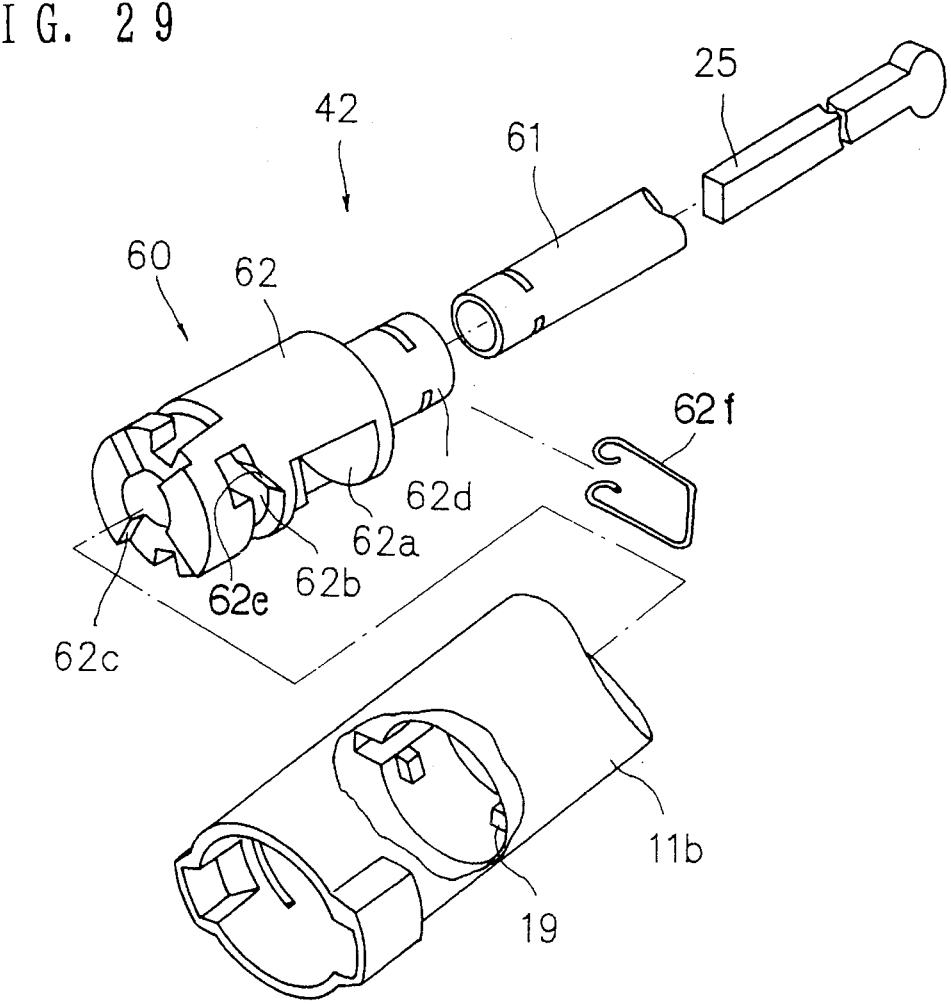
FIG. 29 is an exploded perspective side view of the check lever holding device.
Figure 30:
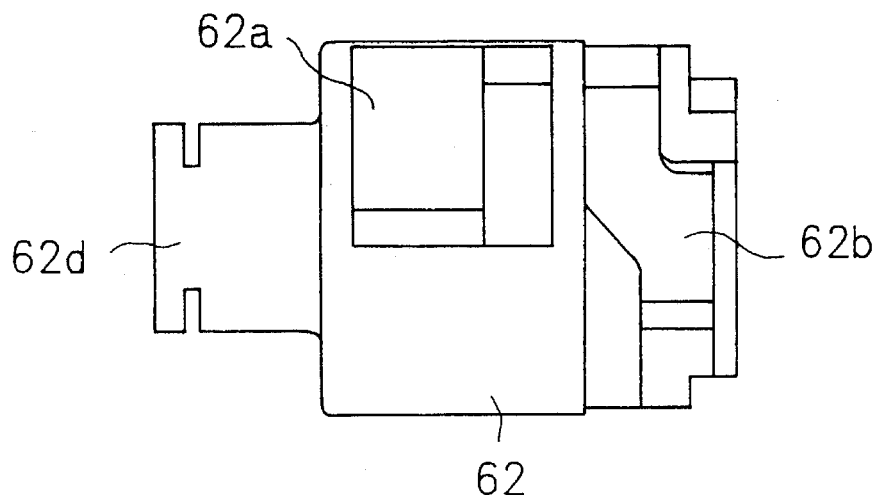
FIG. 30 is a side view of the cylindrical member.
Figure 31:
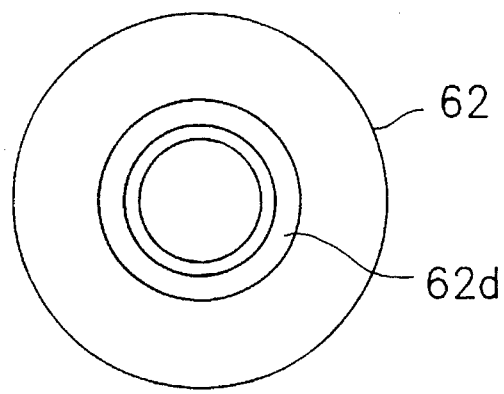
FIG. 31 is a rear end view of the cylindrical member.
Figure 32:
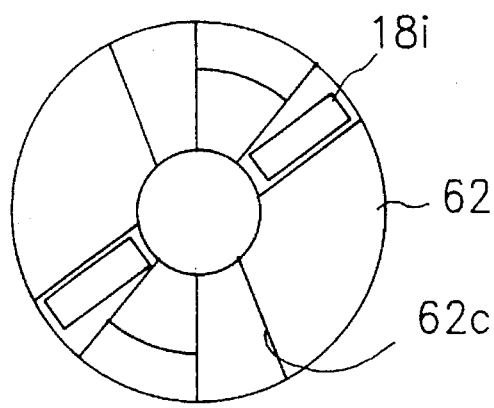
FIG. 32 is a front view of the cylindrical member.
Figure 33:
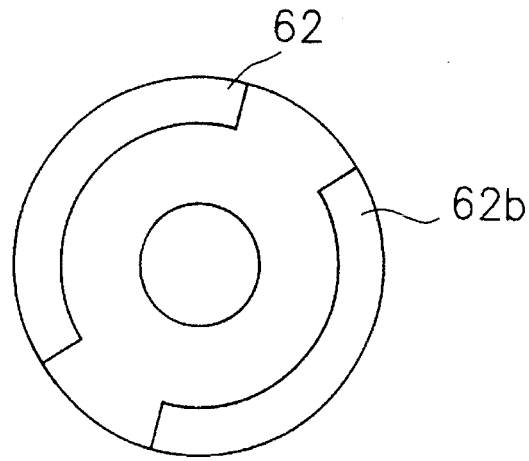
FIG. 33 is a cross-sectional view taken along line A—A in FIG. 30.
Figure 34:
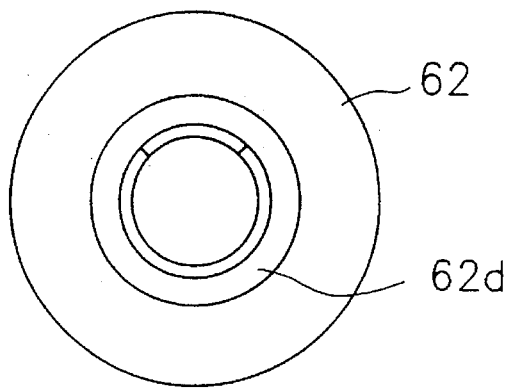
FIG. 34 is a cross-sectional view taken along line B—B in FIG. 30.
Figure 35:
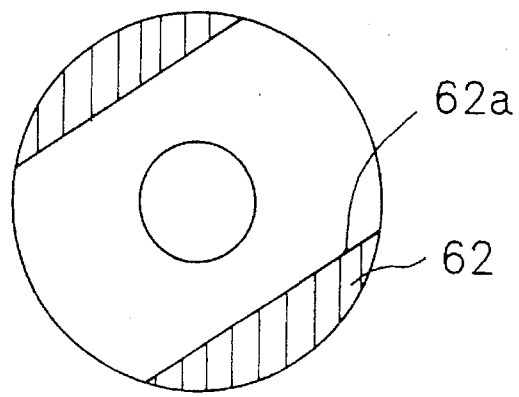
FIG. 35 is a cross-sectional view taken along line C—C in FIG. 30.
Figure 36:
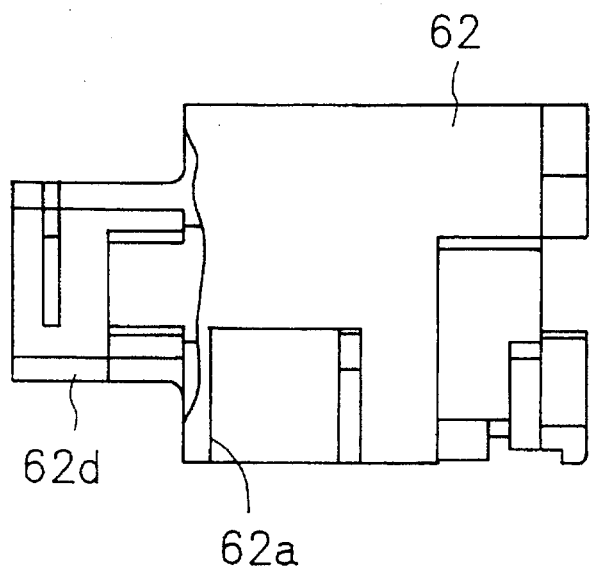
FIG. 36 is a side view of the other side of the cylindrical member.
Figure 37:
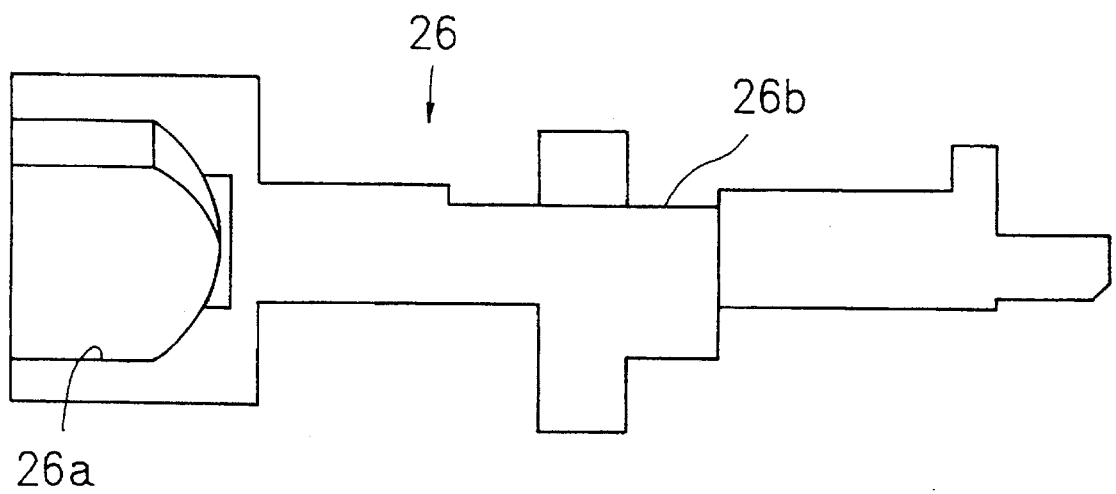
FIG. 37 is a cross-sectional view of the connector shaft.
Figure 38:
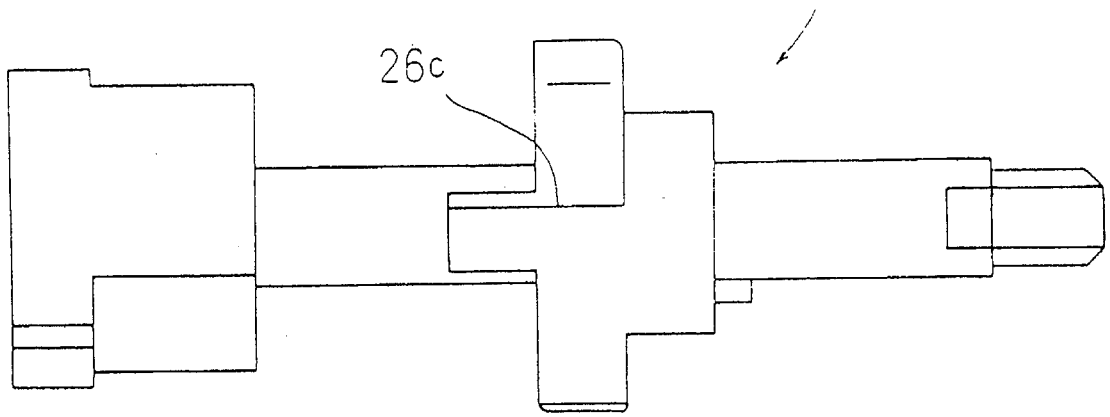
FIG. 38 is a side view of the connector shaft.
Figure 39:
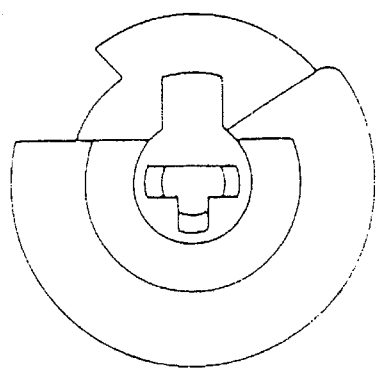
FIG. 39 is a rear end view of the connector shaft.
Figure 40:
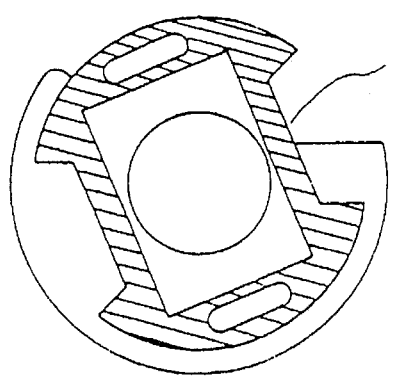
FIG. 40 is a front view of the connector shaft.
Figure 41:
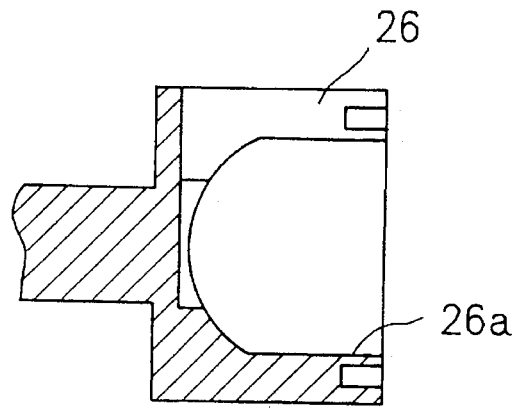
FIG. 41 is a partial cross-sectional view showing the front portion of the connector shaft.
Figure 42:
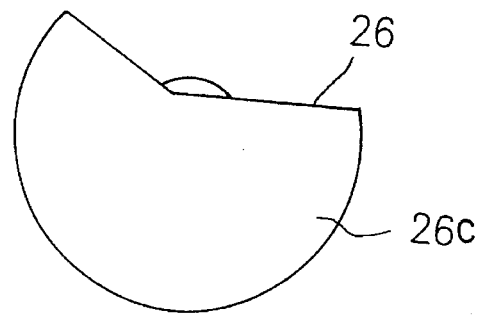
FIG. 42 is a cross-sectional view taken along line B—B in FIG. 37.
Figure 43:
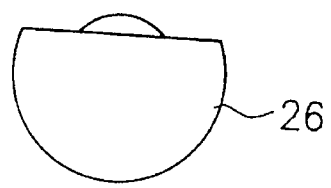
FIG. 43 is a cross-sectional view taken along line C—C in FIG. 37.
Figure 44:
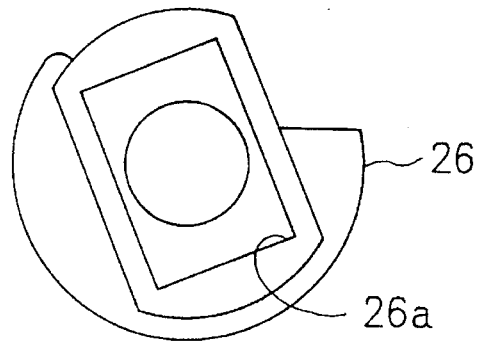
FIG. 44 is a cross-sectional view taken along line D—D in FIG. 37.
Figure 45:
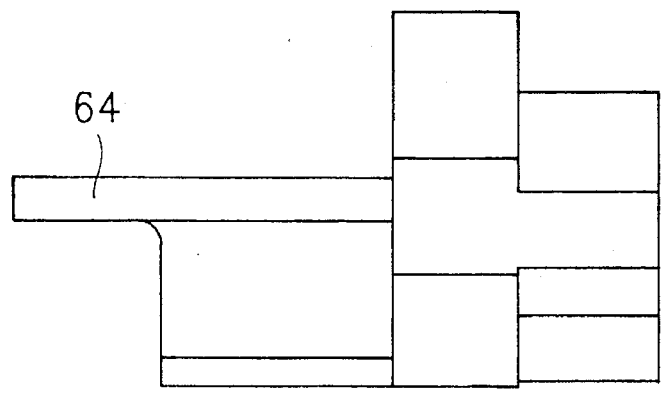
FIG. 45 is a side view of the receptacle member.
Figure 46:
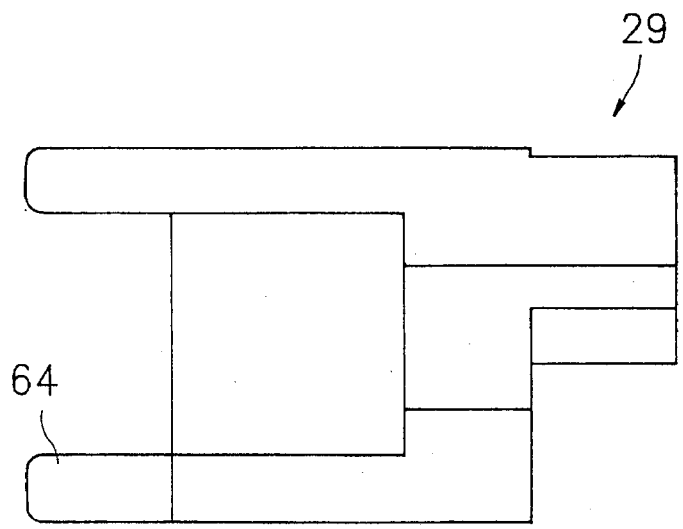
FIG. 46 is a plan view of the receptacle member.
Figure 47:
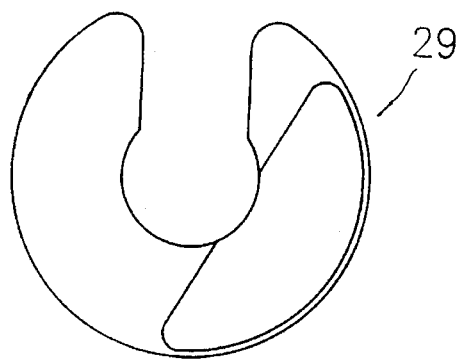
FIG. 47 is a rear end view of the receptacle member.
Figure 48:
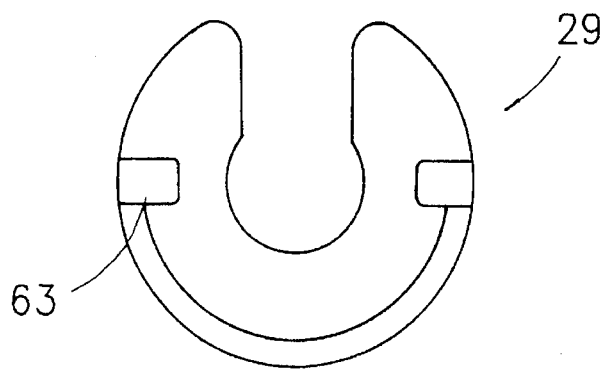
FIG. 48 is a front view of the receptacle member.
Figure 49:
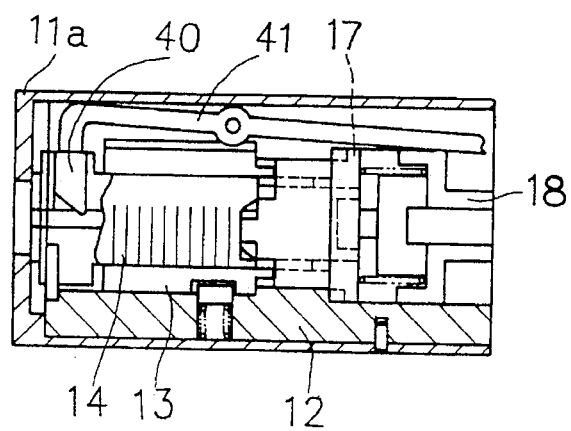
FIG. 49 is a cross-sectional view of the front frame showing the relationships among the components when the key cylinder is rotated by an angle of 10°.
Figure 50:
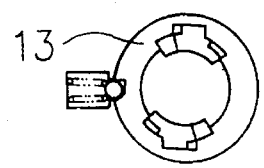
FIG. 50 is a cross-sectional view that illustrates the relation between the key cylinder and the sleeve showing the relationships among the components when the key cylinder is rotated to an angle of 10°.
Figure 51:
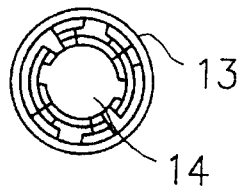
FIG. 51 is a cross-sectional view taken along line G—G in FIG. 2 showing the relationships among the components when the key cylinder is rotated to an angle of 10°.
Figure 52:
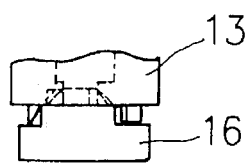
FIG. 52 is a side view that illustrates the relation between the sleeve and the first rotor showing the relationships among the components when the key cylinder is rotated to an angle of 10°.
Figure 53:
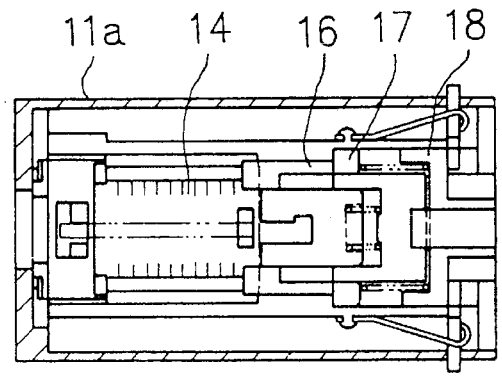
FIG. 53 is a cross-sectional view of the front frame showing the relationships among the components when the key cylinder is rotated to an angle of 10°.
Figure 54:
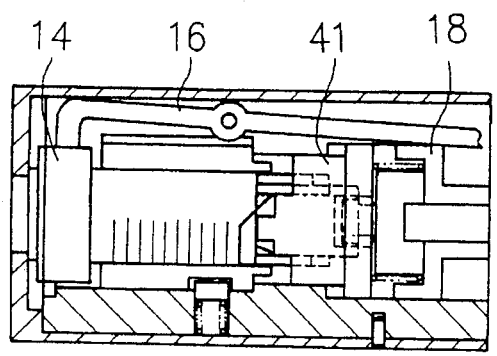
FIG. 54 is a cross-sectional view showing the relationships among the components when the key cylinder is rotated to an angle of 30°.
Figure 55:
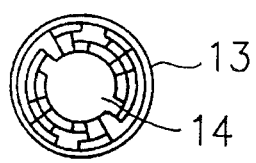
FIG. 55 is a cross-sectional view taken along line G—G in FIG. 2 showing the relationships among the components when the key cylinder is rotated to an angle of 30°.
Figure 56:
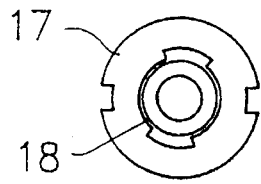
FIG. 56 is a cross-sectional view taken along line J—J in FIG. 2 showing the relationships among the components when the key cylinder is rotated to an angle of 30°.
Figure 57:
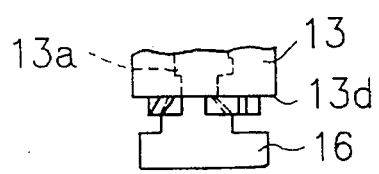
FIG. 57 is a side view that illustrates the relation between the sleeve and the first rotor showing the relationships among the components when the key cylinder is rotated to an angle of 30°.
Figure 58:
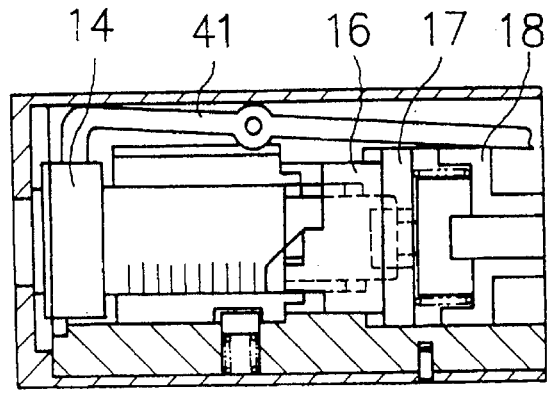
FIG. 58 is a cross-sectional view of the front frame showing the relationships among the components when the key cylinder is rotated to an angle of 50°.
Figure 59:
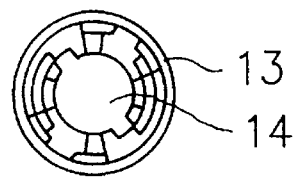
FIG. 59 is a cross-sectional view of taken along line G—G in FIG. 2 showing the relationships among the components when the key cylinder is rotated to an angle of 50°.
Figure 60:
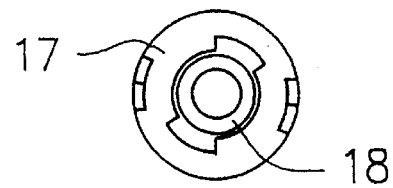
FIG. 60 is a cross-sectional view taken along line J—J in FIG. 2 showing the relationships among the components when the key cylinder is rotated to an angle of 50°.
Figure 61:
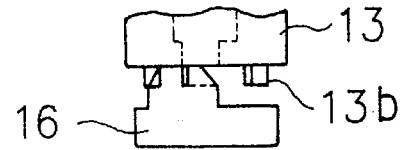
FIG. 61 is a side view that illustrates the relation between the sleeve and the first rotor showing the relationships among the components when the key cylinder is rotated to an angle of 50°.
Figure 62:
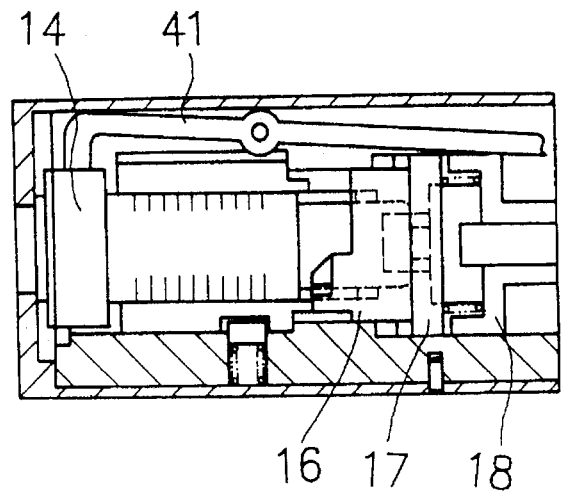
FIG. 62 is a cross-sectional view of the front frame showing the relationships among the components when the key cylinder is rotated to an angle of 70°.
Figure 63:
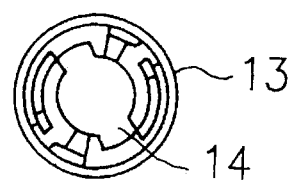
FIG. 63 is a cross-sectional view of taken along line G—G in FIG. 2 showing the relationships among the components when the key cylinder is rotated to an angle of 70°.
Figure 64:
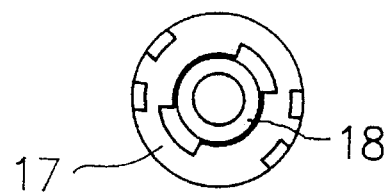
FIG. 64 is a cross-sectional view taken along line J—J in FIG. 2 showing the relationships among the components when the key cylinder is rotated to an angle of 70°.
Figure 65:
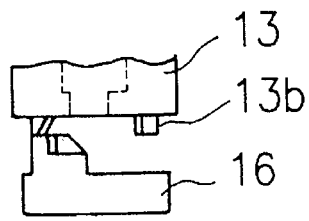
FIG. 65 is a side view that illustrates the relation between the sleeve and the first rotor showing the relationships among the components when the key cylinder is rotated to an angle of 70°.
Figure 66:
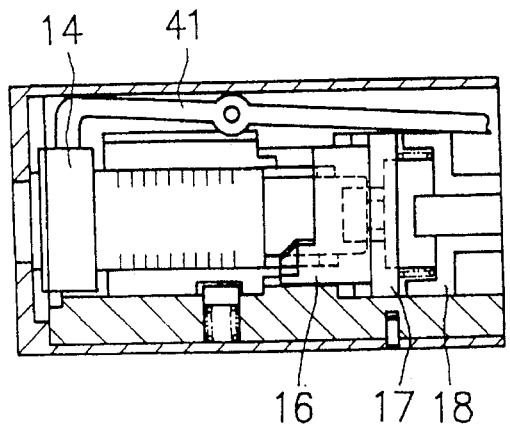
FIG. 66 is a cross-sectional view of the front frame showing the relationships among the components when the key cylinder is rotated to an angle of 90°.
Figure 67:
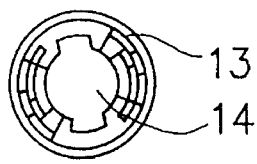
FIG. 67 is a cross-sectional view taken along line G—G in FIG. 2 showing the relationships among the components when the key cylinder is rotated to an angle of 90°.
Figure 68:
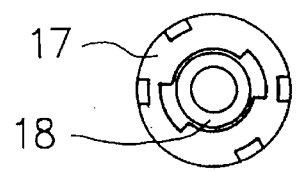
FIG. 68 is a cross-sectional view taken along line J—J in FIG. 2 showing the relationships among the components when the key cylinder is rotated to an angle of 90°.
Figure 69:
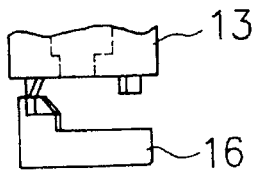
FIG. 69 is a side view that illustrates the relation between the sleeve and the first rotor showing the relationships among the components when the key cylinder is rotated to an angle of 90°.
Figure 84:
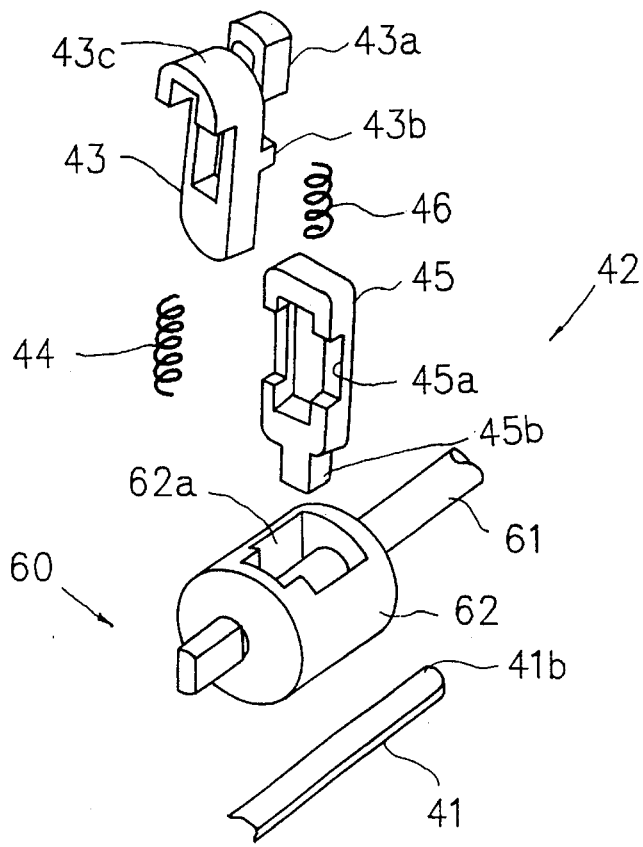
FIG. 84 is an exploded perspective side view of the check lever holding device.

As shown in FIGS. 29 and 84, the check lever holding device 42 includes a delay device 60 arranged outside the connector 25. The delay device 60 comprises the connecting rod 61 that extends in parallel with the connector 25, a cylindrical member 62 connected with the connecting rod 61, a first hooking member 43 arranged inside an opening 62a o the cylindrical member 62, a return spring 44 that pushes the first hooking member 43 outwardly, a second hooking member 45 which is slidable being engaged with the first hooking member 43, and a supplementary spring 46 arranged between an outer protrusion 43a of the first hooking member 43 and the second hooking member 45. The first hooking member 43 comprises an inclined surface 43c which is capable of making contact with the inner end 41b of the check lever 41. The second hooking member 45 is provided with a cutaway part 45a, which engages with the protrusion 43b to determine the amount of movement for the second hooking member 45, and a protrusion 45b which is capable of making contact with a contact surface 11d (FIG. 94) of the middle frame 11b. As shown in FIG. 29, the cylindrical member 62 comprises cam grooves 62b formed around the outer circumferential surface, fan-shaped concave parts 62c formed at the front end, and a cylindrical protrusion 62d formed at the rear end. Inner protrusions 19 of the middle frame 11b are engaged with the cam grooves 62b, and the key members 18i of the second rotor 18 are engaged with the fan-shaped concave parts 62c as shown in FIG. 32. When the cylindrical member 62 is rotated by the rotation of the second rotor 18, if the inner protrusions 19 of the middle frame 11b make contact with the inclined surfaces of the cam grooves 62b, the cylindrical member 62 will move axially while it is rotating. The connecting rod 61 is connected with the cylindrical protrusion 62d by a clip 62f.

Figure 26:
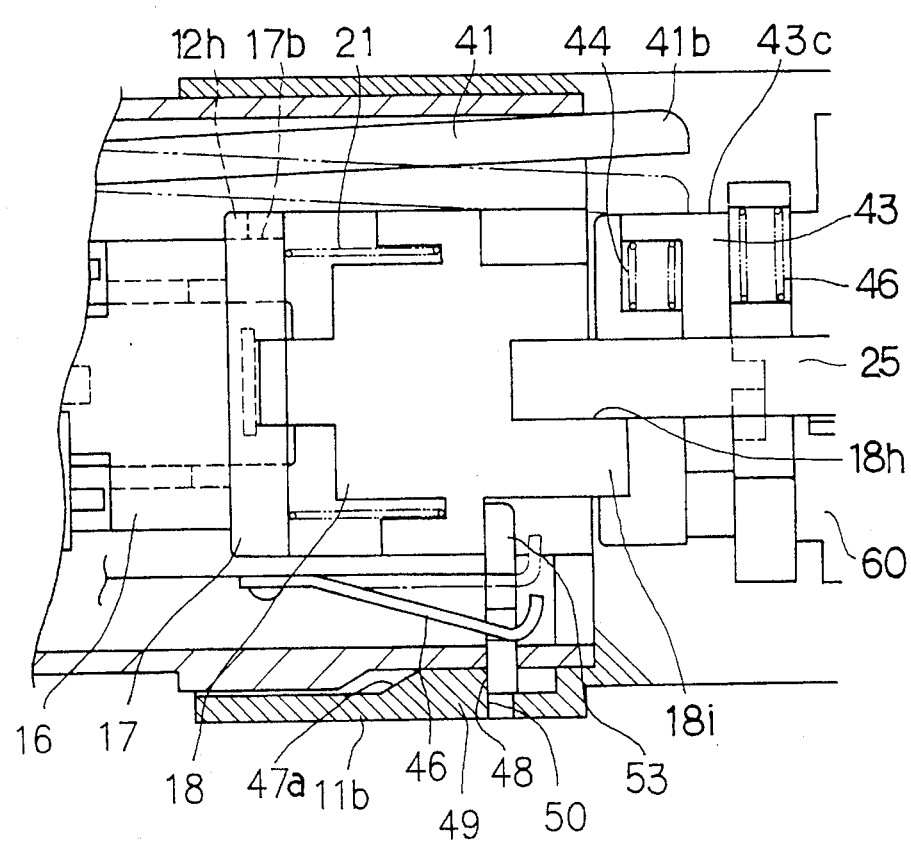
FIG. 26 is an enlarged view of a certain portion in the front frame.
Figure 85:
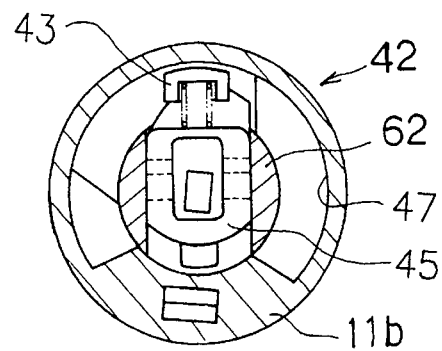
FIG. 85 is a cross-sectional view taken along line D—D in FIG. 2.
Figure 86:
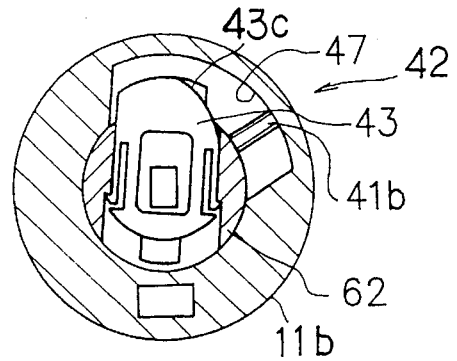
FIG. 86 is a cross-sectional view taken along line C—C in FIG. 2.
Figure 87:
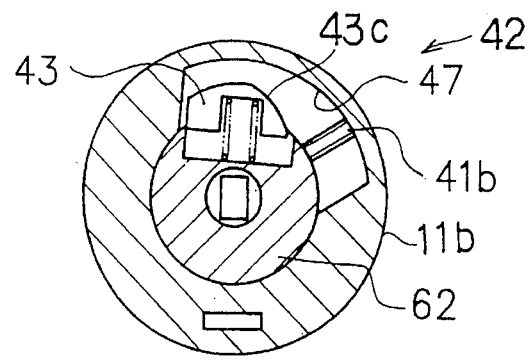
FIG. 87 is a cross-sectional view taken along line B—B in FIG. 2.
Figure 91:
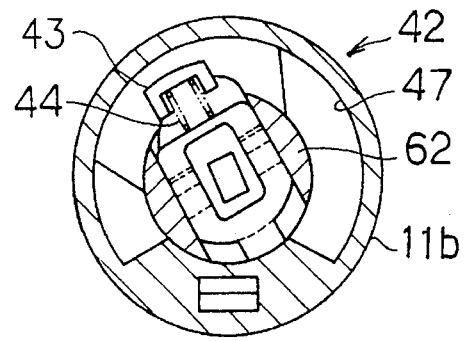
FIG. 91 is a cross-sectional view taken along line D—D in FIG. 2 showing the relationships among the components when the key cylinder is rotated to an angle of 55°.
Figure 92:
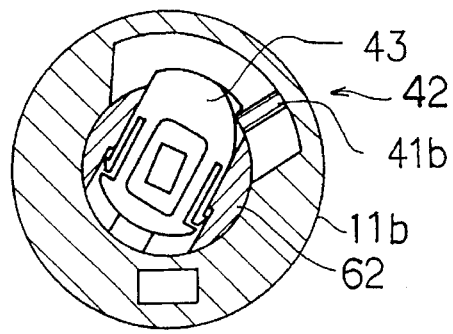
FIG. 92 is a cross-sectional view taken along line C—C in FIG. 2 showing the relationships among the components when the key cylinder is rotated to an angle of 55°.
Figure 93:
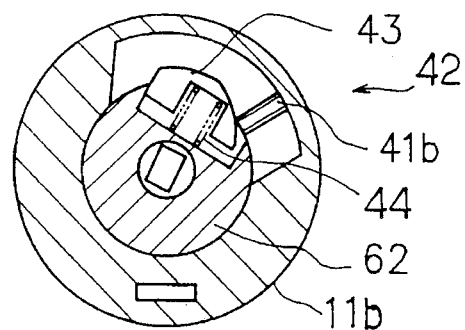
FIG. 93 is a cross-sectional view taken along line B—B in FIG. 2 showing the relationships among the components when the key cylinder is rotated to an angle of 55°.

As shown in FIGS. 85 to 87, when the key cylinder 14 is rotated by the key by an angle of 30°, the first hooking member 43 protrudes into an arcuate groove 47 formed within the middle frame 11b. When the key cylinder 14 is rotated from 30° to 46.3°, the relationships among the components are understood as illustrated in FIGS. 65 to 67 and 88 to 90. When further rotated up to 55°, the relationships among the components are understood as illustrated in FIGS. 91 to 93. In this condition, as indicated in FIGS. 26, 92, and 93, the inner end 41b of the check lever 41 makes contact with the first hooking member 41. Therefore, if the key cylinder 14 if further rotated, the first hooking member 43 will move inwardly in the diametrical direction against the elasticity of the return spring 44 by the inner end 41b of the check lever 41.

Figure 94:
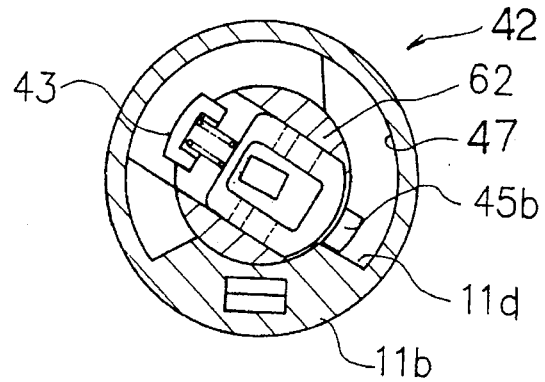
FIG. 94 is a cross-sectional view taken along line D—D in FIG. 2 showing the relationships among the components when the key cylinder is rotated to an angle of 85°.
Figure 95:
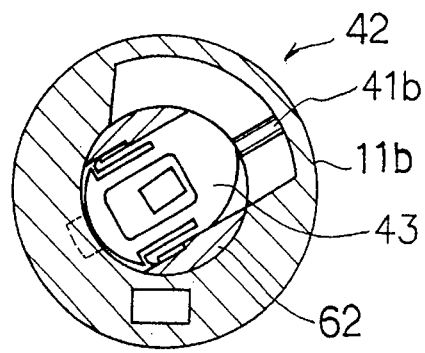
FIG. 95 is a cross-sectional view taken along line C—C in FIG. 2 showing the relationships among the components when the key cylinder is rotated to an angle of 85°.
Figure 96:
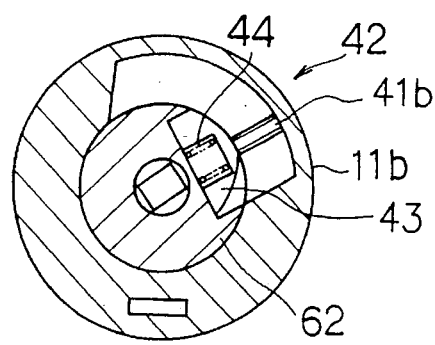
FIG. 96 is a cross-sectional view taken along line B—B in FIG. 2 showing the relationships among the components when the key cylinder is rotated to an angle of 85°.
Figure 97:
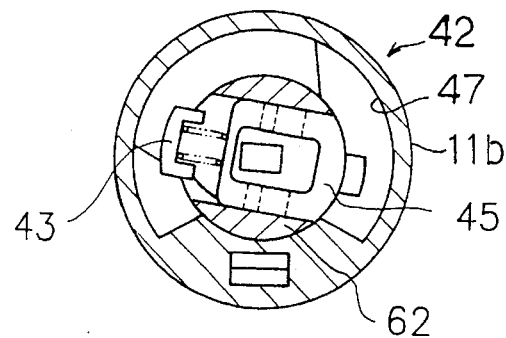
FIG. 97 is a cross-sectional view taken along line D—D in FIG. 2 showing the relationships among the components when the key cylinder is rotated to an angle of 105°.
Figure 98:
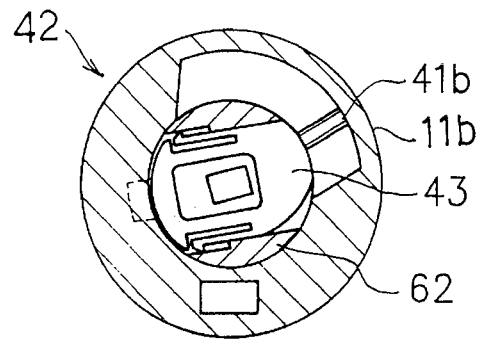
FIG. 98 is a cross-sectional view taken along line C—C in FIG. 2 showing the relationships among the components when the key cylinder is rotated to an angle of 105°.
Figure 99:
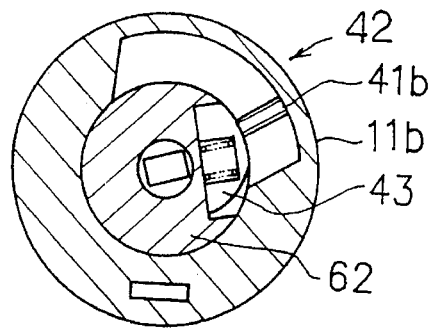
FIG. 99 is a cross-sectional view taken along line B—B in FIG. 2 showing the relationships among the components when the key cylinder is rotated to an angle of 105°.

When rotated up to 85°, the relationships among the components are under stood as illustrated in FIGS. 94 to 96, and the protrusion 45b of the second hooking member 45 protrudes into the arcuate groove 47 formed within the middle frame 11b by the elasticity of the supplementary spring 46. When rotated up to 105°, the relationships among the components are under stood as illustrated in FIGS. 97 to 99. When the key cylinder 14 is rotated back to an angle of 90° from this condition, the relationships among the components are understood as illustrated in FIGS. 94 to 96. As the first hooking member 43 is pushed by the inner end 41b of the check lever 41, it cannot protrude into the arcuate groove 47. After the key cylinder 14 is rotated to the locked position, when the key is removed from the key cylinder 14, since the dog 40 protrudes into the key groove 14e, the check lever 41 is rotated anticlockwise centering around the pin 41c to the position illustrated in FIG. 2. For this reason, the first hooking member 43 is outwardly moved by the elasticity of the return spring 44.

As shown in FIGS. 1 and 26, the front frame 11a is provided with pins 45 that protrude in the diametrical direction. The pins 45 are outwardly pushed by means of plate springs 46. Also, the inner wall of the middle frame 11b is provided with projections 49; each projection 49 has an inclined surface 47a and a contact surface 48. After the components, such as the housing 12, the sleeve 13, the key cylinder 14, and so on, are preliminarily assembled within the front frame 11a, when the front frame 11a is inserted into the middle frame 11b, the pins 45 get over the projections 49 along the inclined surfaces 47a, and they are held by the contact surfaces 48. When pins are inserted into pierced holes 50 formed in the middle frame 11b, the pins 45 are inwardly pushed, and thereby the engagement between the front frame 11a and the projections 49 is released.

Figure 19:
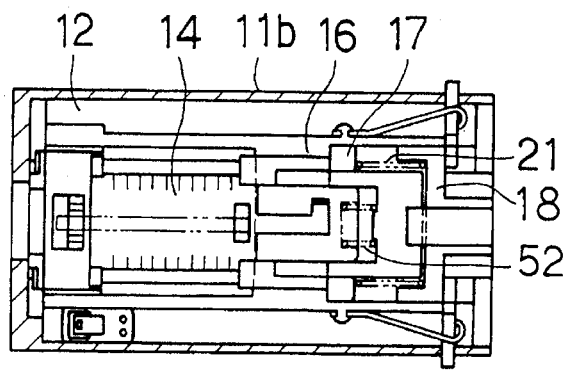
FIG. 19 is a cross-sectional view of the front frame in the locked condition.

In the structure described above, when the key is not inserted into the steering lock device 10, the housing 12, the key cylinder 14, and the second rotor 18 are in the locked condition as shown in FIG. 1. Under the locked condition, as shown in FIG. 18, the moving member 22 is arranged within the first concave part 12b. Also, the first rotor 16, the connector 17, and the second rotor 18 are situated in the locked position as shown in FIG. 19. The connector shaft 26, the arms 63, a cam 26c of the connector shaft 26, and the hanger 30 are situated in the positions illustrated in FIGS. 106 to 108.

As the proper key 40 is inserted into the key cylinder 14, as shown in FIG. 16, the engagement between the tumblers 15 and the housing 12 within the key cylinder 14 is released, and the key cylinder 14 can be rotated relative to the housing 12. Also, the bent end 41a of the check lever 41 is outwardly pushed in the diametrical direction by the dog 40, and it is rotated around the pin 41, then it is moved up to the same circumferential surface as the outer surface of the key cylinder 14 exists. Therefore, the inner end 41b of the check lever 41 moves inwardly in tile diametrical direction. For this reason, when the cylindrical member 62 is rotated, the inner end 41b makes contact with the inclined surface 43c of the first hooking member 43, and it makes the first hooking member 43 move inwardly in the diametrical direction against the elastic force of the return spring 44.

When the key cylinder 14 is manually rotated to an angle of about 10° from the condition that the check lever 41 is rotated, the relationships among the components illustrated in FIGS. 3 to 7, 18 and 19 will be respectively changed to the relationships among the components illustrated in FIGS. 49 to 52. As shown in FIG. 1, as the protrusions 16a of the first rotor 16 are engaged with the concave parts 13d of the sleeve 13, the rotation of the first rotor 16 is prevented by means of the concave parts 13d of the sleeve 13, and thereby the rotor 16 can axially move. However, in the condition that the key cylinder 14 and the sleeve 13 are engaged with each other by means of the tumblers 15, when the sleeve 13 is forced to be rotated by a foreign key, the first rotor 16 rotates together with the sleeve 13. When the key cylinder 14 is rotated to an angle of 30° as understood from FIG. 8, the first rotor 16 is separated from the key cylinder 14 against the elastic force of the rotor springs 21 and axially move to the position indicated in FIGS. 54 to 57 by the contact between the cylinder cams 14a of the key cylinder 14 and the inclined surfaces 16b of the rotor 16. The concave parts 16c of the first rotor 16 and the concave parts 17c of the connector 17 are engaged with the projections 14b of the key cylinder 14, and the first rotor 16 moves along the projections 14b. Due to the movement of the first rotor 16, a pair of the outer protrusions 18c of the second rotor 18 relatively enter into the cutaway part 16d. Thereby, the first rotor 16 and the second rotor 18 can be rotated together as one unit. Also, the check lever holding lever 42 is situated in the position as respectively indicated in FIGS. 85 to 87.

Figure 88:
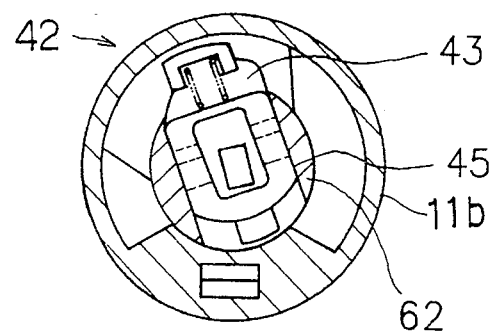
FIG. 88 is a cross-sectional view taken along line D—D in FIG. 2 showing the relationships among the components when the key cylinder is rotated to an angle of 46.3°.
Figure 89:
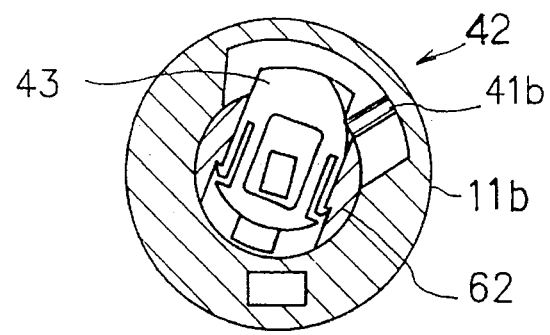
FIG. 89 is a cross-sectional view taken along line C—C in FIG. 2 showing the relationships among the components when the key cylinder is rotated to an angle of 46.3°.
Figure 90:
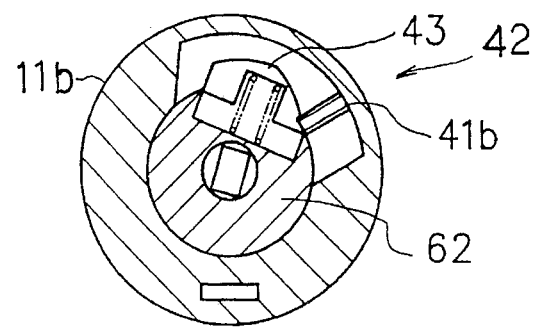
FIG. 90 is a cross-sectional view taken along line B—B in FIG. 2 showing the relationships among the components when the key cylinder is rotated to an angle of 46.3°.
Figure 109:
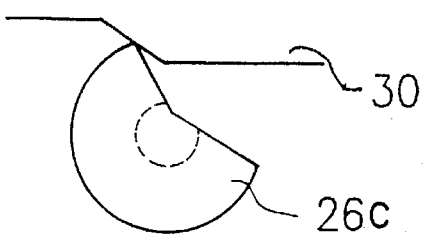
FIG. 109 is a cross-sectional view taken along line T—T in FIG. 1 showing the relationships among the components when the key cylinder is rotated to an angle of 60°.
Figure 110:
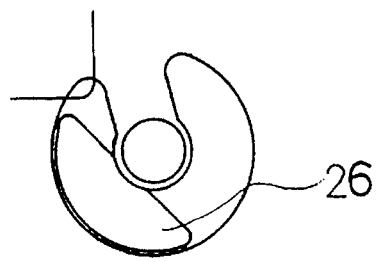
FIG. 110 is a cross-sectional view taken along line S—S in FIG. 1 showing the relationships among the components when the key cylinder is rotated to an angle of 60°.
Figure 111:
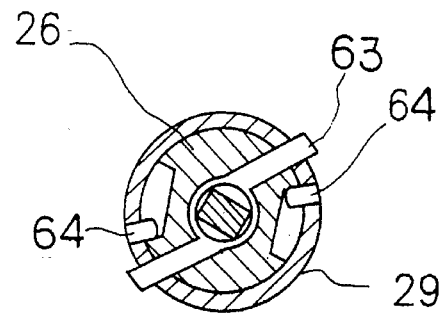
FIG. 111 is a cross-sectional view taken along line U—U in FIG. 1 showing the relationships among the components when the key cylinder is rotated to an angle of 60°.

When the key cylinder 14 is rotated to an angle of 50° passing through the condition that the check lever holding device 42 is situated at an angle of 46.3° as shown in FIGS. 88 to 90, the relationships among the components are seen as illustrated in FIGS. 58 to 61. At this moment, the inclined surfaces 16b of the first rotor 16 make contact with the cam protrusions 13b of the sleeve 13. When the key cylinder is rotated up to an angle of 60°, the relationships among the cam 26c, the hanger 30, the connector shaft 26, and the arms 63 are seen as illustrated in FIGS. 109 to 111. As shown in FIG. 111, the arms 63 and the projections 64 are respectively moving away keeping the same angle between the arm 63 and the projection 64 until the locking rod 32 is pushed by the rod spring 38. The reason for this is that, if the arms 63 and the projections 64 are kept in the condition that they respectively make contact with each other, unexpected results may be produced between the arm 63 and the projection 64 in a tilt motion of the middle frame 11b, and as a result, there is a danger that some of the components may be damaged.

Figure 112:
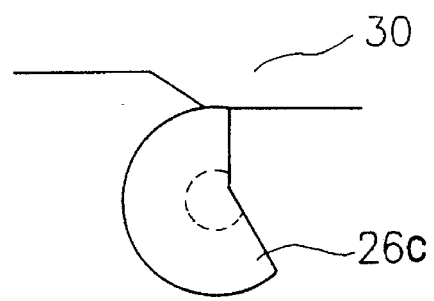
FIG. 112 is a cross-sectional view taken along line T—T in FIG. 1 showing the relationships among the components when the key cylinder is rotated to an angle of 90°.
Figure 113:
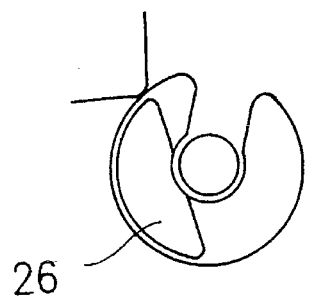
FIG. 113 is a cross-sectional view taken along line S—S in FIG. 1 showing the relationships among the components when the key cylinder is rotated to an angle of 90°.
Figure 114:
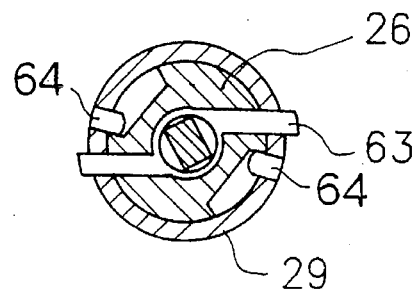
FIG. 114 is a cross-sectional view taken along line U—U in FIG. 1 showing the relationships among the components when the key cylinder is rotated to an angle of 90°.

After that, the key cylinder is rotated to an angle of 70°, the inclined surfaces 16b of the first rotor 16 move along the cam protrusions 13b of the sleeve 13, and thereby as shown in FIGS. 62 to 65 the first rotor 16 is further moved in the axial direction. At this moment, since the wide parts 14c of the projections 14b of the key cylinder 14 are engaged with the concave parts 16c of the first rotor 16, even though the key cylinder 14 is rotated either in the ON direction or the LOCK direction, no play between the key cylinder 14 and the first rotor 16 will be produced in rotation. In this condition, as illustrated in FIGS. 75 to 77 and 121 to 123, the key cylinder 14 can be rotated up to the starting position of an angle of 152° passing through its situation at the ON position. That is to say, when the key cylinder 14 is rotated to 90° passing through each condition that the check lever holding device 42 is situated at an angle of 55° as respectively illustrated in FIGS. 91 to 93 and each condition at angle of 85° as respectively illustrated in FIGS. 94 to 96, the relationships among the components are understood as illustrated in FIGS. 66 to 69. The relationships among the cam 26c, the hanger 30, the connector shaft 26, and the arms 63 are seen as illustrated in FIGS. 112 to 114. At this moment, as illustrated in FIG. 70, the moving member 22 shown in FIG. 18 gets over the inclined surface 12c and the protrusion 12d, and it is engaged with the second concave part 12f. Also, when the key cylinder 14 is situated at an angle of 105°, the relationships among the components are understood as illustrated in FIGS. 115 to 117.

Figure 74:
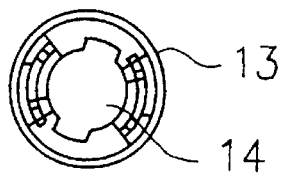
FIG. 74 is a cross-sectional view taken along line G—G in FIG. 2 showing the relationships among the components when the key cylinder is rotated to an angle of 120°.
Figure 75:
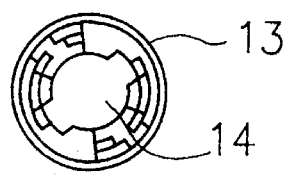
FIG. 75 is a cross-sectional view taken along line G—G in FIG. 2 showing the relationships among the components when the key cylinder is rotated to an angle of 152°.
Figure 76:
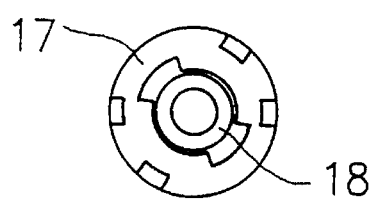
FIG. 76 is a cross-sectional view taken along line J—J in FIG. 2 showing the relationships among the components when the key cylinder is rotated to an angle of 152°.
Figure 77:
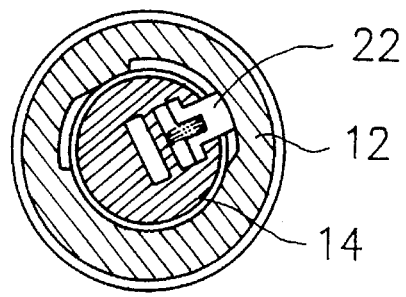
FIG. 77 is a side view that illustrates the front of the key cylinder showing the relationships among the components when the key cylinder is rotated to an angle of 152°.
Figure 115:
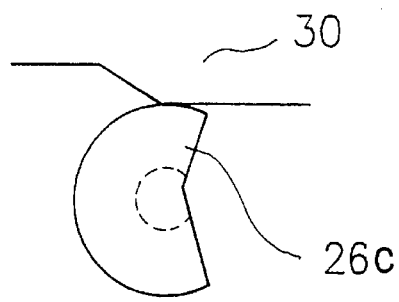
FIG. 115 is a cross-sectional view taken along line T—T in FIG. 1 showing the relationships among the components when the key cylinder is rotated to an angle of 105°.
Figure 116:
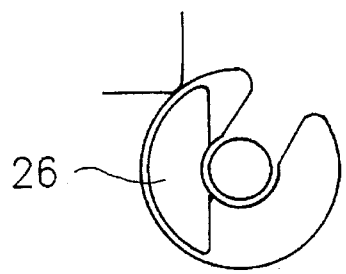
FIG. 116 is a cross-sectional view taken along line S—S in FIG. 1 showing the relationships among the components when the key cylinder is rotated to an angle of 105°.
Figure 117:
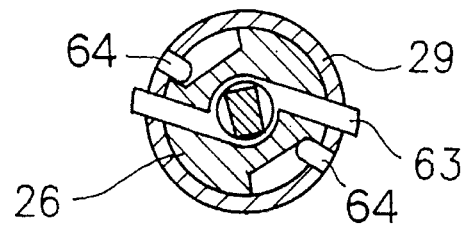
FIG. 117 is a cross-sectional view taken along line U—U in FIG. 1 showing the relationships among the components when the key cylinder is rotated to an angle of 105°.
Figure 118:
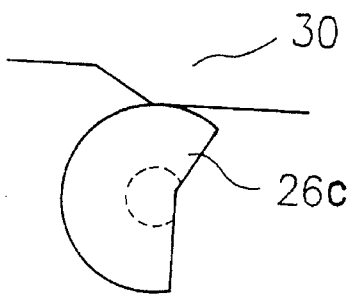
FIG. 118 is a cross-sectional view taken along line T—T in FIG. 1 showing the relationships among the components when the key cylinder is rotated to an angle of 120°.
Figure 119:
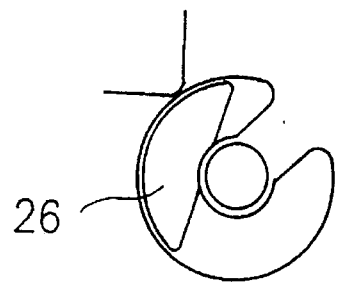
FIG. 119 is a cross-sectional view taken along line S—S in FIG. 1 showing the relationships among the components when the key cylinder is rotated to an angle of 120°.
Figure 120:
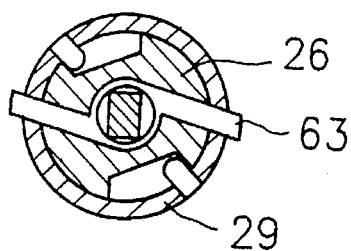
Figure 121:
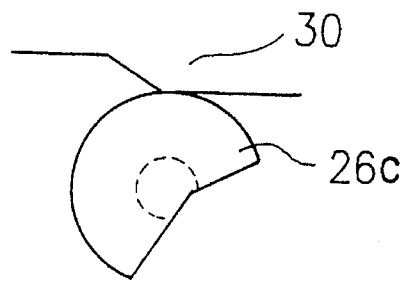
Figure 122:
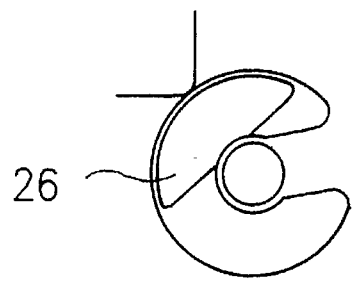
Figure 123:
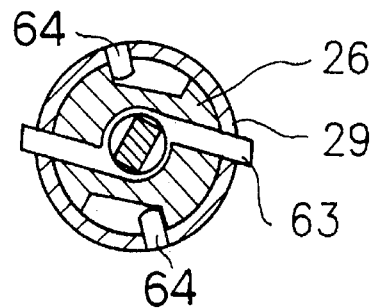

Concerning the cam 26c, the hanger 30, the connector shaft 26, and the arms 63, their relationships are understood as illustrated in FIGS. 115 to 117. When the key cylinder 14 is further rotated passing through each condition of the check lever holding device 42 situated as respectively illustrated in FIGS. 97 to 99, the relationships among the components, which are situated at an angle of 120°, are understood as illustrated in FIG. 74, and therefore, as for the cam 26f, the hanger 30, the connector shaft 26, and the arms 63, the relationships are understood as illustrated in FIGS. 118 to 120. At an angle of 152°, the relationships are seen as illustrated in FIGS. 75 to 77, and the relationships among the cam 26c, the hanger 30, the connector shaft 26 and the arms 63 are understood as illustrated in FIGS. 121 to 123.

Figure 81:
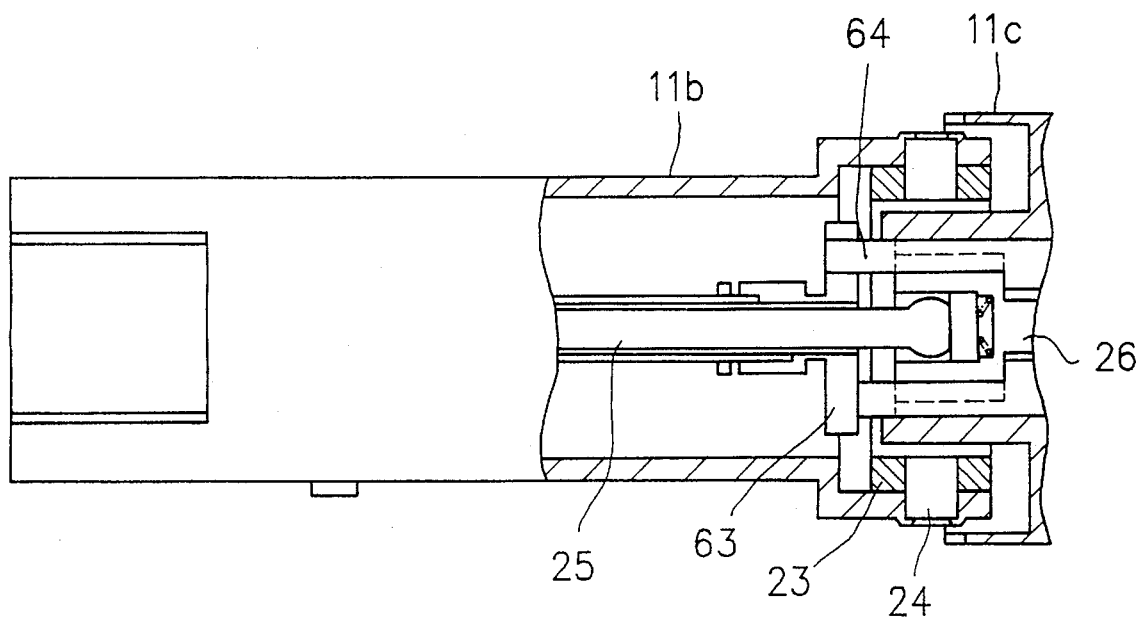
FIG. 81 is a cross-sectional view of the tilt structure taken in the different direction.
Figure 82:
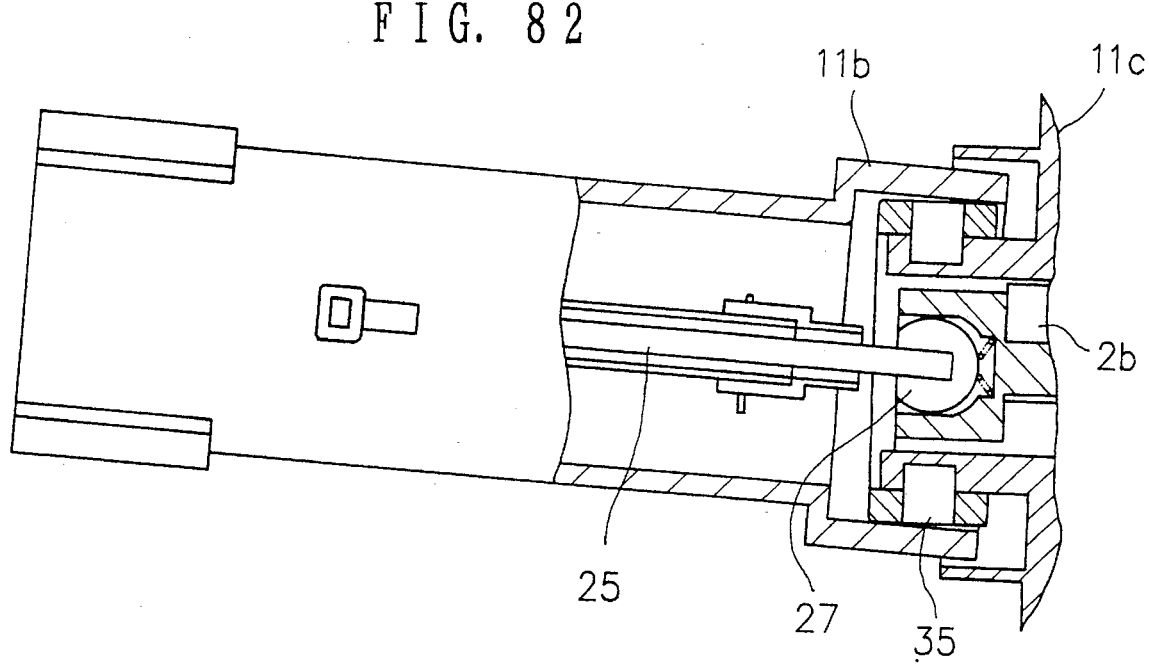
FIG. 82 is a partial cross-sectional view showing the relationships among the components when the middle frame is rotated around axis.
Figure 83:
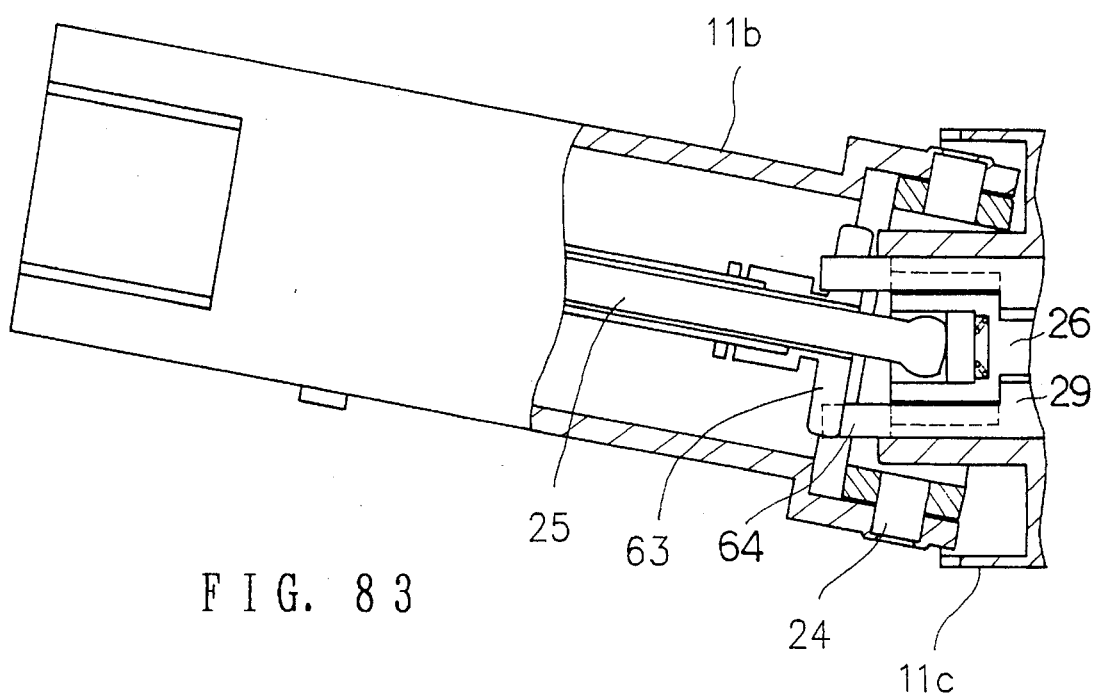
FIG. 83 is a partial cross-sectional view showing the relationships among the components when the middle frame is rotated around different axis.

When the key cylinder 14 is rotated to an angle of about 100°, as the cam grooves 62b are rotated along the inner protrusions 19 of the middle frame 11b (FIG. 29), the cylindrical member 62 is moved in the axial direction and toward the side of the locking rod 32. For this reason, the engagement between the cylindrical member 62 and the key members 18i (FIG. 32) of the second rotor 18 is released, and thereby the rotation of the delay device 60 is stopped. However, due to the connection between the second rotor 18 and the connector 25, as the connector shaft 26 is continuously rotated, the ignition switch 28 is rotated up to the starting position. Because of this, the arms 63 shown in FIG. 117 are not rotated from the positions indicated in FIG. 94 to the positions indicated in FIG. 123 and from the positions indicated in FIG. 123 to the positions indicated in FIG. 135. It is because an articulate motion has to be made between the middle frame 11b and the rear frame 11c. That is, in case an articulate motion is made between the middle frame 11b and the rear frame 11c as shown in FIGS. 81 to 83, the check lever 42 does not need to be rotated up to an angle of 152° and it needs to be stopped in the condition that the check lever holding device 42 has been rotated to an angle of 90°. Therefore, in accordance with the rotation of the key cylinder 14 which has been made after that, the engagement between the arms 63 of the connector rod 61 and the projections 64 of the receptacle member 29 is retained, and the connector shaft 26 is rotated together with the connector 25.

Figure 124:
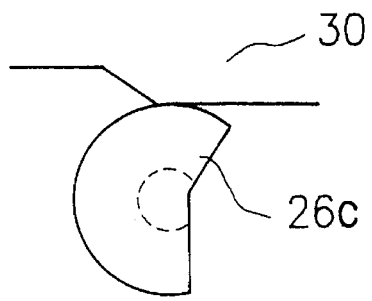
Figure 125:
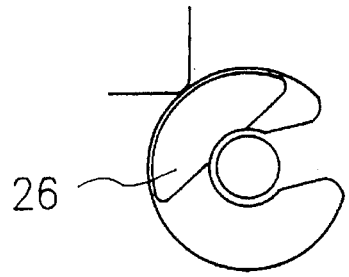
Figure 126:
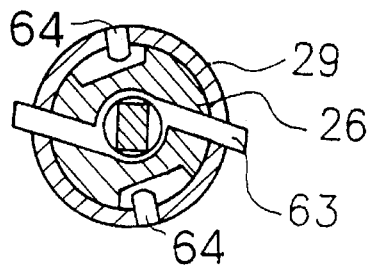
Figure 127:
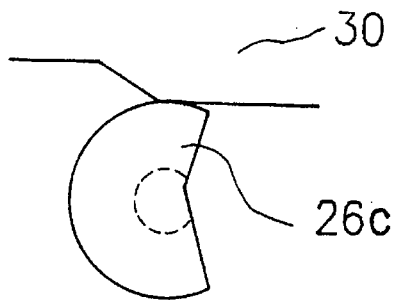
Figure 128:
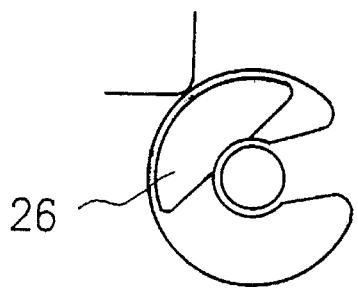
Figure 129:
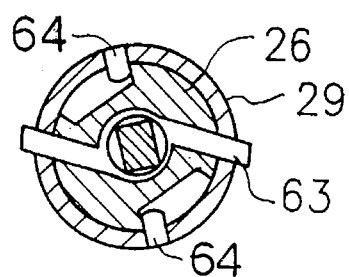

When the key cylinder 14 is returned back to 120° from this condition. the relationships among the cam 26c, the hanger 30, the connector shaft 26 and the arms 63 are understood as illustrated in FIGS. 124 to 126. When the key cylinder 14 is returned back to 105°, their relationships are understood as illustrated in FIGS. 127 to 129.

Figure 73:
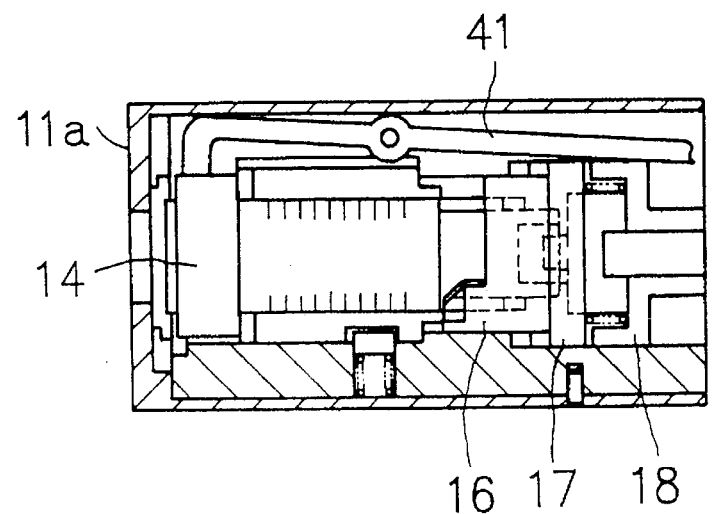
FIG. 73 is a cross-sectional view of the front frame showing the relationships among the components when the key cylinder is pushed.
Figure 103:
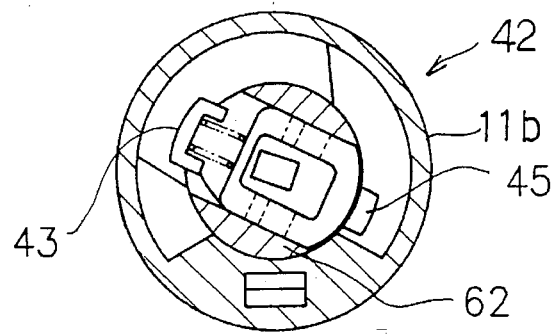
FIG. 103 is a cross-sectional view taken along line D—D in FIG. 2 showing the relationships among the components when the key cylinder is rotated to an angle of 90°.
Figure 104:
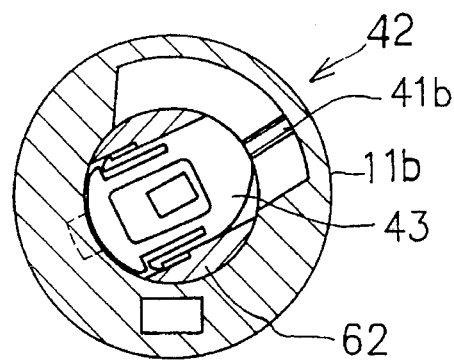
FIG. 104 is a cross-sectional view taken along line C—C in FIG. 2 showing the relationships among the components when the key cylinder is rotated to an angle of 90°.
Figure 105:
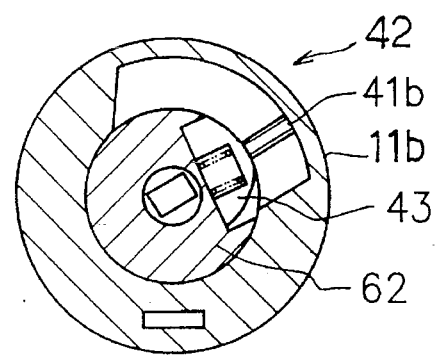
FIG. 105 is a cross-sectional view taken along line B—B in FIG. 2 showing the relationships among the components when the key cylinder is rotated to an angle of 90°.
Figure 130:
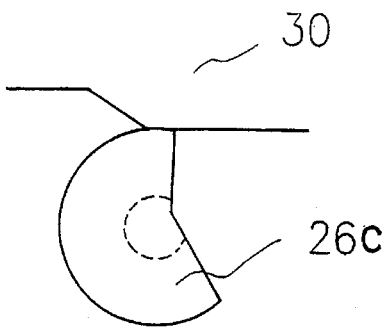
Figure 131:
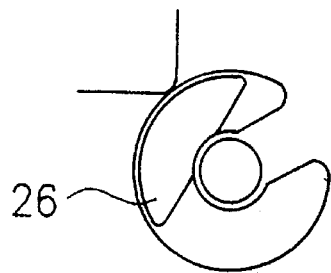

When the key cylinder 14 is returned back to 90°, the relationships among the components of the check lever holding device 42 are understood as illustrated in FIGS. 103 to 105. Also, the relationships among the components of the key cylinder 14 are seen in FIG. 73. The relationships among the cam 26c, the hanger 30, the connector shaft 26 and the arms 63 are understood as illustrated in FIGS. 130 to 132. At this moment, as shown in FIG. 70, as the pin 22 makes contact with a contact surface 12e of a cam surface 12b, the key cylinder 14 cannot be rotated toward the locked position. Therefore, when the key is pushed together with the key cylinder 14 against the elasticity of cylinder springs 52, the pin 22 inwardly gets out of the contact surface 12e, and the engagement between the contact surface 12e and the pin 45 is released. Because of this, the key can be rotated together with the key cylinder 14 to the locked position. When the key cylinder 14 is returned back to 60°, the relationships among the cam 26c, the hanger 30, the connector shaft 26 and the arms 63 are understood as illustrated in FIGS. 133 to 135. When returned back to 30°, the relationships are understood as illustrated in FIGS. 136 to 138. The connector shaft 26 is rotated up to the initial locked position.

Figure 100:
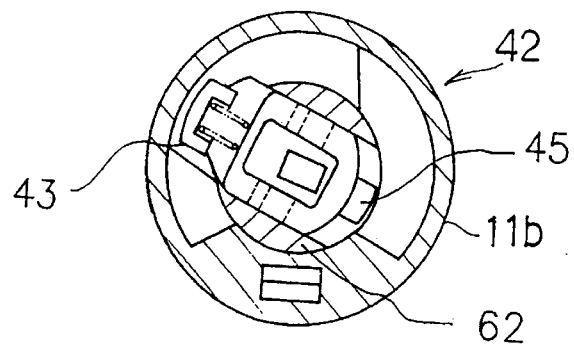
FIG. 100 is a cross-sectional view taken along line D—D in FIG. 2 showing the relationships among the components when the key cylinder is rotated to the locked position.
Figure 101:
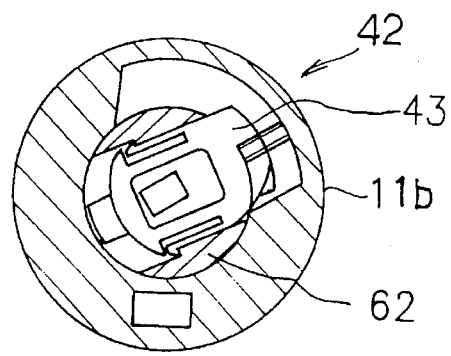
FIG. 101 is a cross-sectional view taken along line C—C in FIG. 2 showing the relationships among the components when the key cylinder is rotated to the locked position.
Figure 102:
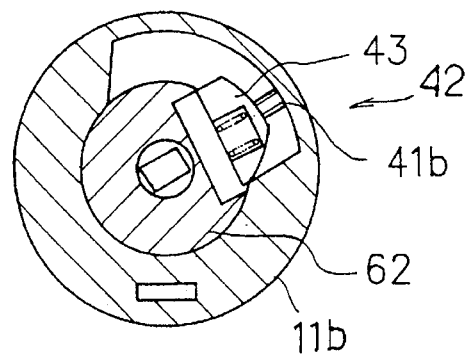
FIG. 102 is a cross-sectional view taken along line B—B in FIG. 2 showing the relationships among the components when the key cylinder is rotated to the locked position.

However, unless the key is removed from the key cylinder 14, the protrusion 45b of the second hooking member 45 is retained in the condition that it is engaged with the contact surface 11c of the middle frame 11b by the inner end 41b of the check lever 41 as illustrated in FIG. 94, and thereby the components of the check lever holding device 42 are maintained in the condition as illustrated in FIGS. 94 to 96. When the key is removed from the key cylinder 14, the inner end 41b of the check lever 41 is separated from the first hooking member 43. Because of this, the first hooking member 43 and the second hooking member 45 move in the diametrical direction by means of the elasticity of the return spring 44, to thereby release the engagement between the protrusion 45b of the second hooking member 45 and the contact surface 11d of the middle frame 11b as shown in FIG. 94. For this reason, the hanger 30 and the locking rod 32 are moved to the locked position by the elasticity of the rod spring 38. Also, due to the movement of the hanger 30, as the semicircular part of the receptacle member 29 is moved to the locked position as shown in FIG. 137, the projections 64 move together with the arms 63 to the position indicated in FIG. 138 from the position indicated in FIG. 141. At this moment, the projections 64 move in the annular grooves 26b of the connector shaft 26. Therefore, the cylindrical member 62 can move to the position as respectively indicated in FIGS. 85 to 87 from the position as respectively indicated in FIGS. 100 to 102.

The relationships among the cam 26c, the hanger 30, the connector shaft 26 and the arms 63 are understood as illustrated in FIGS. 139 to 141, and thereby the locking rod 32 moves to the locked position from the unlocked position.

When the key cylinder is rotated by a foreign key, the key cylinder 14 is retained in the condition that it is connected with the housing 12 by means of the tumblers 15, and thereby it is rotated with the housing 12. For this reason, as the key cylinder 14 does not rotate relative to the housing 12, the first rotor 16 does not move in the axial direction relative to the housing 12. Therefore, as shown in FIG. 17, the ball 37 is pushed outwardly from the V-shaped groove 13c against the elasticity of the ball spring 36. For this reason, the sleeve 13, the key cylinder 14 and the first rotor 16 freely rotate as on unit. In this case, since the relative rotations of the key cylinder 14 and the first rotor 16 cannot be obtained, the key cylinder 14 and the first rotor 16 cannot be obtained. The key cylinder 14 will not connect with the second rotor 18 via the first rotor 16. Also, as grooves 17b of a stopper 17 are retained in the condition that they are engaged with protrusions 12h of the housing 12, the second rotor 18 is prevented from rotating.

in this embodiment, the tilt structure is provided with the axle 24 and the axle 35, and thereby the middle frame 11b can be rotated individually around the axle 24 or the axle 35 for the rear frame 11c as shown in FIGS. 82 and 83.

In this way, in the steering lock device 10 according to the present invention, the key cylinder 14 is rotated together with the sleeve 13 in case of an unauthorized attempt to unlock, and thereby the second lever is prevented from rotating. Therefore, excessive external force cannot be given to the tumblers 15 for such unauthorized attempts.

The present invention is not limited to the aforementioned embodiment, and various modifications may be implemented.

For instance, pin tumblers may be used in stead of disk tumblers employed as the tumblers 15 in the embodiment described above. In addition, the cylinder cams 14a may be formed in a rotating member that rotates together with the key cylinder 14 as one unit in stead of the cylinder cams 14a formed in the key cylinder 14.

AVAILABILITY IN INDUSTRY

As described above, according to the present invention, as the steering lock device that provides significant resistance to destruction, damage or tampering can be obtained, there will be possibilities that it will effectively prevents crimes such as breaking into motor vehicles, motor vehicle thefts, and so on.

I claim:

1. A steering lock device comprising: a frame;

a housing arranged in the frame;

a sleeve rotatably arranged within the housing, said sleeve being formed with grooves;

a key cylinder rotatably arranged within the sleeve;

tumblers slidably arranged within said key cylinder for engagement with and disengagement from said grooves of said sleeve;

a first rotor rotatable and axially movable in said sleeve with respect to the sleeve, said first rotor being in cam connection with said key cylinder; and a second rotor connected with a locking rod and an ignition switch in operation;

the first rotor being axially moved for connection with the second rotor when the key cylinder is rotated relative to the sleeve so that said key cylinder, first rotor and second rotor are rotated together to move the locking rod from the locked to the unlocked position;

said key cylinder being rotated together with said sleeve to prevent axial movement of said first rotor when an incorrect key is inserted into said key cylinder and rotated.

2. The steering lock device of claim 1, further comprising a sleeve holding device in said housing for preventing rotation of said sleeve;

said sleeve being rotated against resilient force of said sleeve holding device when said key cylinder is rotated in the engaged condition of the tumblers and sleeve.

3. The steering lock device of claim 1, further comprising:

a rotor spring arranged between said first and second rotors;

a sleeve holding device for holding said sleeve in angular position but allowing said sleeve to rotate in said housing when excessive rotating force is applied to said sleeve; and a connector arranged between said first and second rotors;

said key cylinder having a cylinder cam in contact with said first rotor;

said tumblers being disengaged from said sleeve to release said key cylinder from said sleeve when a correct key is inserted into said key cylinder;

the rotation of said key cylinder resulting in axial movement of said first rotor through said cylinder cam, said first rotor being axially moved from the disconnected position from said second rotor to the connected position with said second rotor when said key cylinder is rotated to a certain angular position relative to said sleeve;

further rotation of said key cylinder together with said first and second rotors from said certain angular position permits said locking rod to move from the locked to unlocked position;

said connector preventing the second rotor from rotating when the first rotor is rotated together with the sleeve when an incorrect key is inserted into and rotated with said key cylinder.

4. The steering lock device of claim 3, wherein the first rotor is further axially moved when the key cylinder is further rotated after rotation by a certain angle relative to the sleeve.

5. The steering lock device of claim 3, wherein a check lever is rotatably mounted by a pin outside the sleeve in the frame, one end of said check lever being in contact with a dog radially slidable when a key is inserted into the key cylinder, and the other end of said check lever being drivingly connected with a check lever holding device.

6. The steering lock device of claim 3, further comprising a check lever holding device which includes a delay device for holding said locking rod in the locked position until the key is removed from the key cylinder.

7. The steering lock device of claim 3, wherein the delay device further comprises a cylindrical member drivingly connected with the key cylinder;

a first hooking member slidably arranged in an opening of the cylindrical member for driving connection with the other end of the check lever;

a return spring for resiliently radially urging the first hooking member;

a second hooking member having a protrusion engageable with the frame, said second hooking member being slidable in parallel with the first hooking member;

a supplementary spring for resiliently radially urging the second hooking member in the opposite direction to the first hooking member; and the protrusion of the second hooking member being engaged with the frame when the other end of the check lever pushes the first hooking member.

8. The steering lock device of claim 3, wherein the frame comprises a middle frame and a rear frame for articulate motion of said frame between the middle and rear frames.

* * * * *